US011945288B2

(12) United States Patent
Choi

(10) Patent No.: US 11,945,288 B2
(45) Date of Patent: Apr. 2, 2024

(54) VEHICLE DOOR OPENING AND CLOSING APPARATUS

(71) Applicants: Hyundai Motor Company, Seoul (KR); Kia Corporation, Seoul (KR)

(72) Inventor: Je Won Choi, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 467 days.

(21) Appl. No.: 17/306,029

(22) Filed: May 3, 2021

(65) Prior Publication Data

US 2022/0090421 A1 Mar. 24, 2022

(30) Foreign Application Priority Data

Sep. 21, 2020 (KR) .................. 10-2020-0121748

(51) Int. Cl.
| | |
|---|---|
| B60J 5/04 | (2006.01) |
| B60J 5/06 | (2006.01) |
| E05B 83/40 | (2014.01) |
| E05B 85/24 | (2014.01) |
| E05B 85/26 | (2014.01) |
| E05D 15/48 | (2006.01) |
| E06B 3/50 | (2006.01) |

(52) U.S. Cl.
CPC ................ *B60J 5/047* (2013.01); *B60J 5/06* (2013.01); *E05B 83/40* (2013.01); *E05B 85/245* (2013.01); *E05B 85/26* (2013.01); *E05D 15/48* (2013.01); *E06B 3/5054* (2013.01); *E05D 2015/485* (2013.01); *E05Y 2201/684* (2013.01); *E05Y 2201/688* (2013.01); *E05Y 2900/531* (2013.01)

(58) Field of Classification Search
CPC .... B60J 5/047; E05D 15/48; E05D 2015/485; E06B 3/5054
USPC ............................................ 296/155, 146.11
See application file for complete search history.

(56) References Cited

U.S. PATENT DOCUMENTS

| | | | | |
|---|---|---|---|---|
| 9,731,583 | B2 * | 8/2017 | Maruyama | ............... B60J 5/047 |
| 9,822,579 | B2 * | 11/2017 | Maruyama | ............... E06B 3/509 |
| 2006/0059783 | A1 * | 3/2006 | Braun | ..................... E05B 83/40 |
| | | | | 49/360 |
| 2021/0140215 | A1 | 5/2021 | Choi | |

FOREIGN PATENT DOCUMENTS

KR 20210057616 A 5/2021

* cited by examiner

*Primary Examiner* — Dennis H Pedder
(74) *Attorney, Agent, or Firm* — Slater Matsil, LLP

(57) ABSTRACT

A vehicle door opening and closing apparatus includes a vehicle door, a rail configured to be mounted on a vehicle body, a roller unit mounted on the vehicle door, and configured to allow the vehicle door to open and close in a sliding mode in which the vehicle door is configured to slide along the rail and in a swing mode in which the vehicle door is configured to swing in a predetermined position of the rail, and a hold lock releasably holding the vehicle door in an open position or releasably holding the vehicle door in a closed position when the vehicle door is opened or closed in the sliding mode, respectively.

20 Claims, 36 Drawing Sheets

VEHICLE DOOR OPENING AND CLOSING APPARATUS

CROSS-REFERENCE TO RELATED APPLICATIONS

This application claims the benefit of Korean Patent Application No. 10-2020-0121748, filed in the Korean Intellectual Property Office on Sep. 21, 2020, which application is hereby incorporated herein by reference.

TECHNICAL FIELD

The present disclosure relates to a vehicle door opening and closing apparatus.

BACKGROUND

Vehicles have door apertures for ingress and egress of passengers to and from a passenger compartment. A vehicle door is closed to block the door aperture and is opened to enable ingress and egress of passengers to and from the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively much force and time to open and close, which hinders quick ingress and egress of passengers.

According to the related art, as a vehicle door is operated by a single opening and closing method, it may be difficult to adequately respond to the needs of customers seeking ease of use, diversity, and novelty.

Meanwhile, the vehicle includes an open hold lock, which releasably holds the vehicle door in an open position, and a closed hold lock, which releasably holds the vehicle door in a closed position. An open striker may be mounted on the vehicle body, and the open striker may be positioned to correspond to the open position of the vehicle door. A catch of the open hold lock may releasably engage with the open striker. The vehicle door may be releasably held by the open hold lock and the open striker. A closed striker may be mounted on the vehicle body, and the closed striker may be positioned to correspond to the closed position of the vehicle door. A catch of the closed hold lock may releasably engage with the closed striker. The vehicle door may be releasably held by the closed hold lock and the closed striker.

However, as the related art vehicle door has two hold locks (the open hold lock and the closed hold lock) which releasably hold different strikers, it may have a complex structure, require a relatively large number of components, increase the amount of assembly work, provide poor operation quality of the vehicle door, and increase cost and weight.

The above information described in this background section is provided to assist in understanding the background of the inventive concept, and may include any technical concept which is not considered as the prior art that is already known to those skilled in the art.

SUMMARY

Embodiments of the present disclosure can solve problems occurring in the prior art while advantages achieved by the prior art are maintained intact.

The present disclosure relates to a vehicle door opening and closing apparatus. Particular embodiments relate to a vehicle door opening and closing apparatus allowing a vehicle door to open and close in one mode selected from a sliding mode and a swing mode.

An embodiment of the present disclosure provides a vehicle door opening and closing apparatus allowing a vehicle door to open and close in one mode selected from a swing mode and a sliding mode, thereby satisfying the needs of customers.

According to an embodiment of the present disclosure, a vehicle door opening and closing apparatus may include a vehicle door, a rail mounted on a vehicle body, a roller unit mounted on the vehicle door, and allowing the vehicle door to open and close in one mode selected from a sliding mode in which the vehicle door slides along the rail and a swing mode in which the vehicle door swings in a predetermined position of the rail, and a hold lock releasably holding the vehicle door in an open position and releasably holding the vehicle door in a closed position when the vehicle door is opened and closed in the sliding mode.

The hold lock may include a first catch releasably engaging with a first striker mounted on the vehicle body and positioned to correspond to the closed position, and a second catch releasably engaging with a second striker mounted on the vehicle body and positioned to correspond to the open position.

The hold lock may include a first pawl operatively connected to the first catch, and a second pawl operatively connected to the second catch.

The first catch and the second catch may partially overlap each other, the first catch and the second catch may form a unitary one-piece structure, and the first catch and the second catch may pivot through a first hinge shaft.

The first catch may include a first main slot receiving the first striker, and the second catch may include a second main slot receiving the second striker.

The first catch may move between a first engaging position and a first release position, the first engaging position may refer to a position in which the first catch engages with the first striker, and the first release position may refer to a position in which the first catch releases the first striker. The second catch may move between a second engaging position and a second release position, the second engaging position may refer to a position in which the second catch engages with the second striker, and the second release position may refer to a position in which the second catch releases the second striker.

The first catch and the second catch may be biased to the first release position and the second release position by a first biasing element.

The first pawl and the second pawl may pivot through a second hinge shaft.

The first catch and the second catch may form a unitary one-piece structure, the first pawl may be aligned with the second catch, the second pawl may be aligned with the first catch, the first catch may have a first locking shoulder releasably engaging with the second pawl, and the second catch may have a second locking shoulder releasably engaging with the first pawl.

The first pawl may move between a first pawl locking position and a first pawl release position, the first pawl locking position may refer to a position in which the first pawl is locked to the second locking shoulder, and the first pawl release position may refer to a position in which the first pawl is released from the second locking shoulder. The second pawl may move between a second pawl locking position and a second pawl release position, the second pawl locking position may refer to a position in which the second pawl is locked to the first locking shoulder, and the second pawl release position may refer to a position in which the second pawl is released from the first locking shoulder.

The first pawl and the second pawl may be biased to the first pawl locking position and the second pawl locking position by a second biasing element.

The hold lock may further include a first release lever operatively connected to the first pawl, and a second release lever operatively connected to the second pawl, and the first pawl, the second pawl, the first release lever, and the second release lever may pivot through a second hinge shaft.

The hold lock may further include a first release lever pivoting with the first pawl, and a second release lever pivoting with the second pawl, and the first release lever and the second release lever may be connected to a cable. When the cable is pulled, the first release lever may be configured to allow the first catch to release the first striker, and when the cable is pulled, the second release lever may be configured to allow the second catch to release the second striker.

The hold lock may further include a first pull lever operatively connected to the first pawl, and a second pull lever operatively connected to the second pawl, and the first pull lever and the second pull lever may be connected to a cable. When the cable is pulled, the first pull lever may be configured to allow the first catch to release the first striker, and when the cable is pulled, the second pull lever may be configured to allow the second catch to release the second striker.

The first catch and the second catch may be connected by a connection portion, and the first catch may be spaced apart from the second catch.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
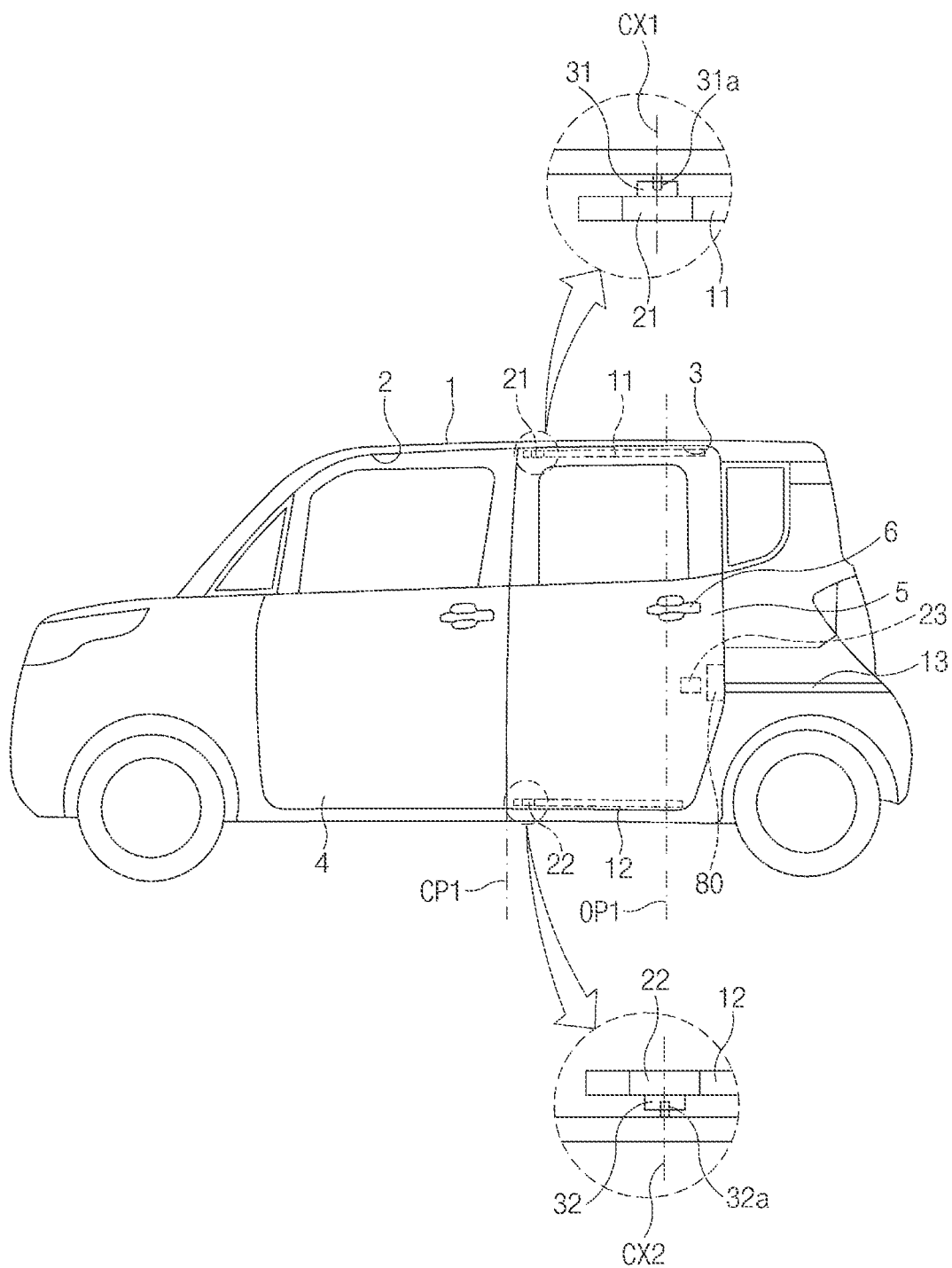
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 4 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 1 and 12.

Figure 3:
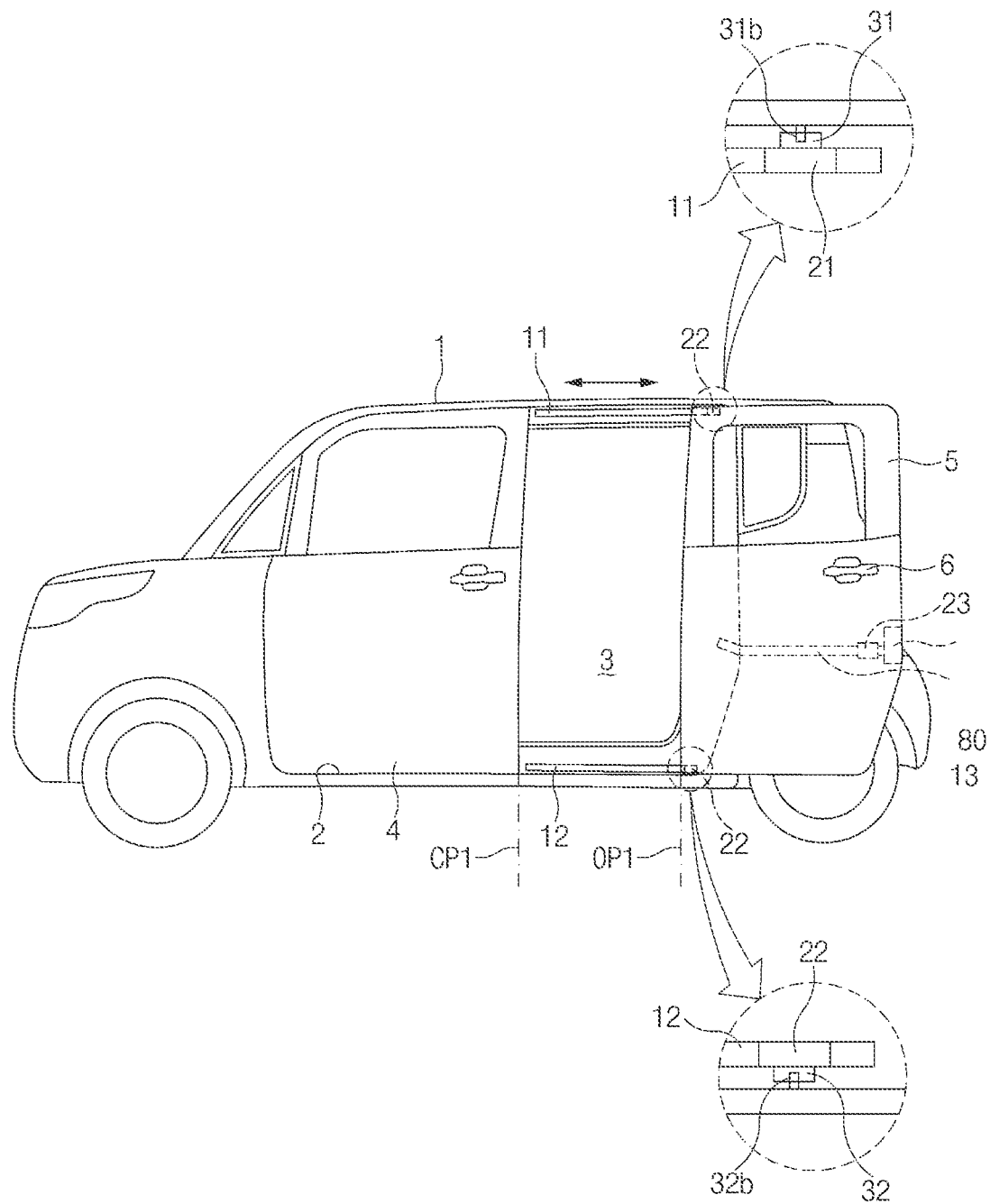
FIG. 3 illustrates a state in which the door of FIG. 1 is opened in a sliding mode.

Referring to FIGS. 1 and 3, an upper roller unit 21 may be mounted on an upper end of the vehicle door 5, and the upper roller unit 21 may slide along the upper rail 11. A lower roller unit 22 may be mounted on a lower end of the vehicle door 5, and the lower roller unit 22 may slide along the lower rail 12.

Figure 2:
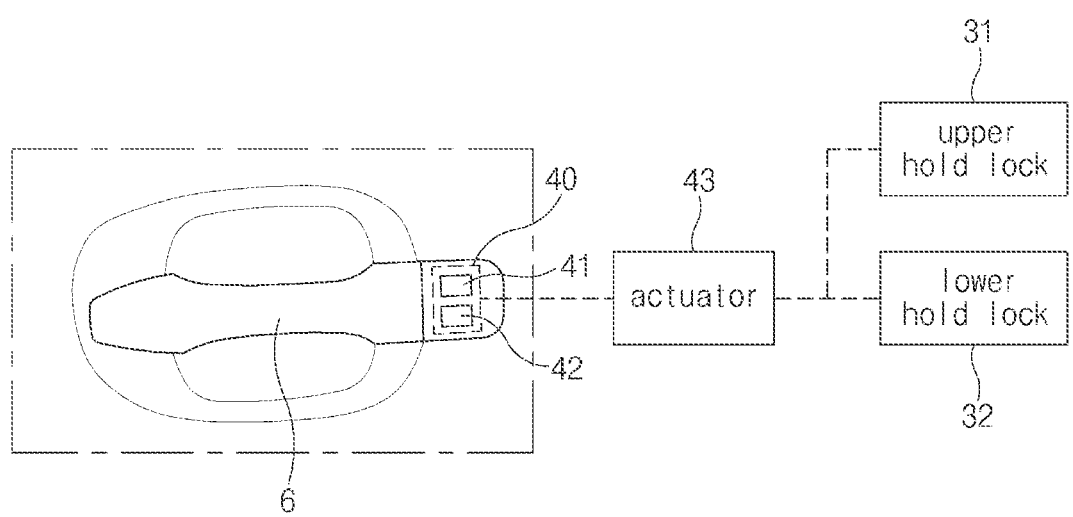
FIG. 2 illustrates a selector adjacent to an outside handle of a vehicle, an actuator connected to the selector, and hold locks.

Referring to FIG. 2, the vehicle door 5 may include an outside handle 6, and a selector 40 for selecting the sliding mode and the swing mode may be disposed on the outside handle 6 or the vehicle door adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
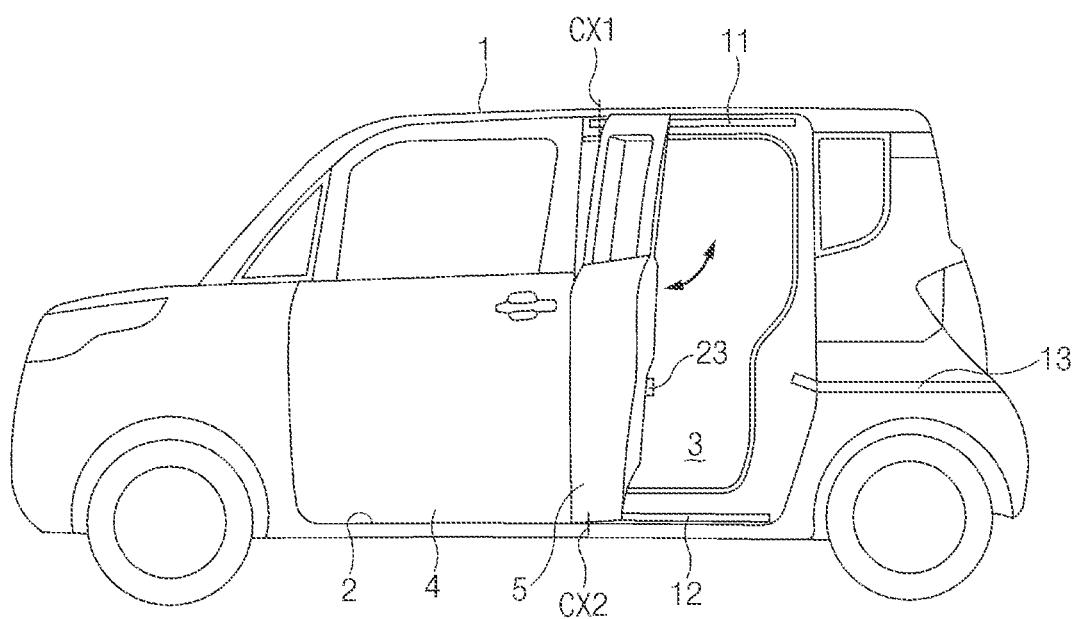
FIG. 4 illustrates a state in which the door of FIG. 1 is opened in a swing mode.
Figure 6:
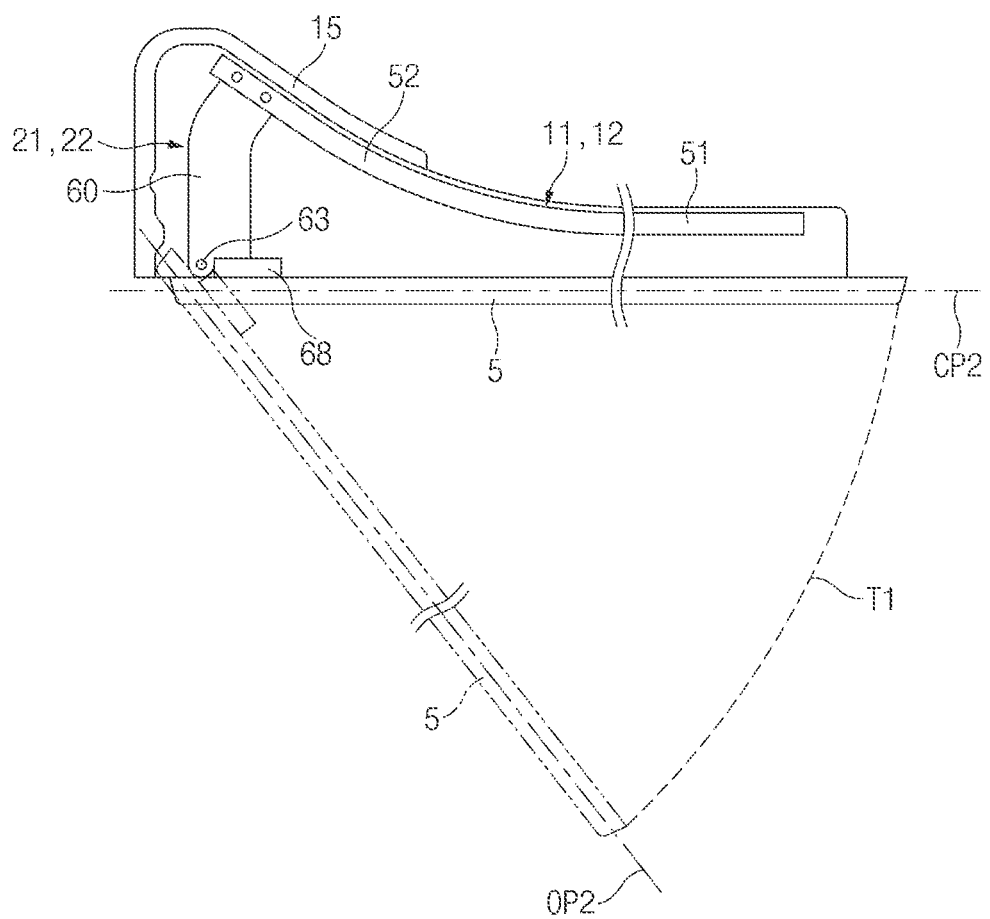
FIG. 6 illustrates a state in which a vehicle door pivots by an upper roller unit and a lower roller unit when the vehicle door is opened and closed in a swing mode in a vehicle door opening and closing apparatus according to an exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior side of the vehicle. In the swing mode, the vehicle door 5 may move between a second open position OP2 in which the vehicle door 5 is fully opened and a second closed position CP2 in which the vehicle door 5 is fully closed, as illustrated in FIG. 6. In particular, when the vehicle door 5 is held in the first closed position CP1, it may be operated in the swing mode.

The upper roller unit 21 may have an upper hold lock 31, and the vehicle body 1 may have a first upper striker 31a and a second upper striker 31b protruding downwardly from a roof of the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. Referring to FIGS. 9 to 29, the upper hold lock 31 may selectively hold the first upper striker 31a and the second upper striker 31b. As the upper hold lock 31 holds the first upper striker 31a, the upper roller unit 21 may be firmly held in the first closed position CP1, so that the vehicle door 5 may be kept in the first closed position CP1. As the upper hold lock 31 holds the second upper striker 31b, the upper roller unit 21 may be firmly held in the first open position OP1, so that the vehicle door 5 may be kept in the first open position OP1.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and may releasably hold the second upper striker 31b in the first open position OP1. That is, the upper closed hold lock, which releasably holds the first upper striker 31a in the first closed position CP1, and the upper open hold lock, which releasably holds the second upper striker 31b in the first open position OP1, may be individually mounted on the upper roller unit 21.

Referring to FIG. 4, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from a floor of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. Referring to FIGS. 9 to 29, the lower hold lock 32 may selectively hold the first lower striker 32a and the second lower striker 32b. As the lower hold lock 32 holds the first lower striker 32a, the lower roller unit 22 may be firmly held in the first closed position CP1, so that the vehicle door 5 may be kept in the first closed position CP1. As the lower hold lock 32 holds the second lower striker 32b, the lower roller unit 22 may be firmly held in the first open position OP1, so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and may releasably hold the second lower striker 32b in the first open position OP1. That is, the lower closed hold lock, which releasably holds the first lower striker 32a in the first closed position CP1, and the lower open hold lock, which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32, so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIG. 4, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, and the vehicle door 5 may rotate around the vertically aligned upper and lower rotation axes CX1 and CX2.

Referring to FIG. 2, the selector 40 may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31a and the lower hold lock 32 holds the first lower striker 32a, and a release operation in which the upper hold lock 31 releases the first upper striker 31a and the lower hold lock 32 releases the first lower striker 32a.

When the user presses the first switch 41 of the selector 40 in a state in which the vehicle door 5 is closed, the upper hold lock 31 may release the first upper striker 31a and the lower hold lock 32 may release the first lower striker 32a simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31a and the lower hold lock 32 may hold the first lower striker 32a simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an actuator operating the upper hold lock 31 and another actuator operating the lower hold lock 32 may be individually connected to the selector 40.

Figure 5:
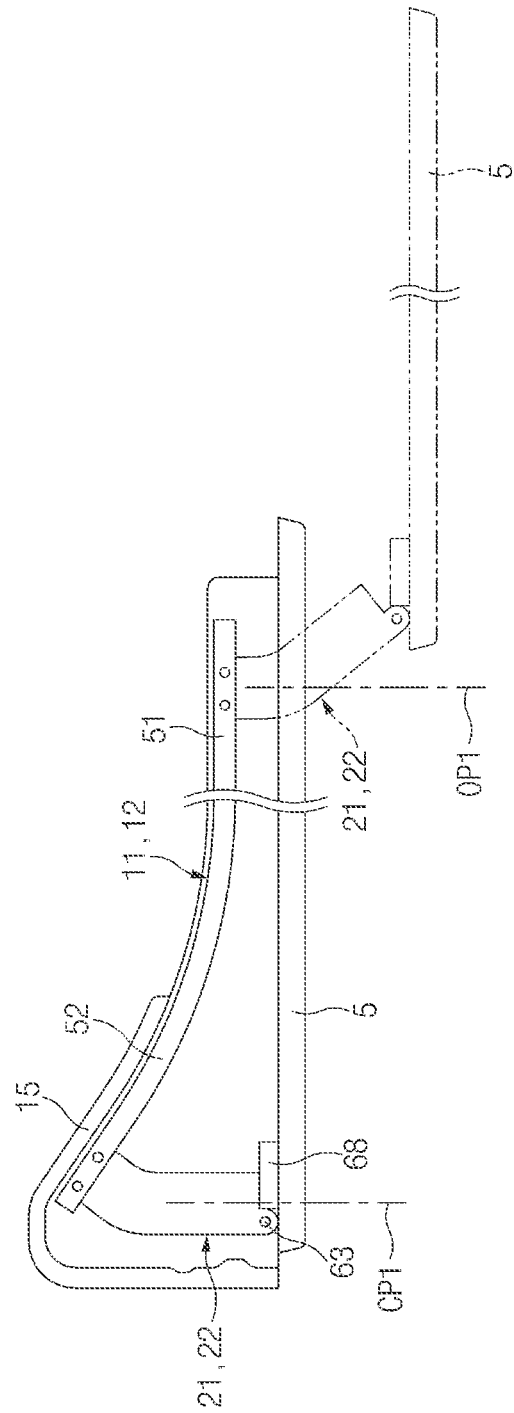
FIG. 5 illustrates a state in which an upper roller unit and a lower roller unit move along an upper rail and a lower rail when a vehicle door is opened and closed in a sliding mode in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 7:
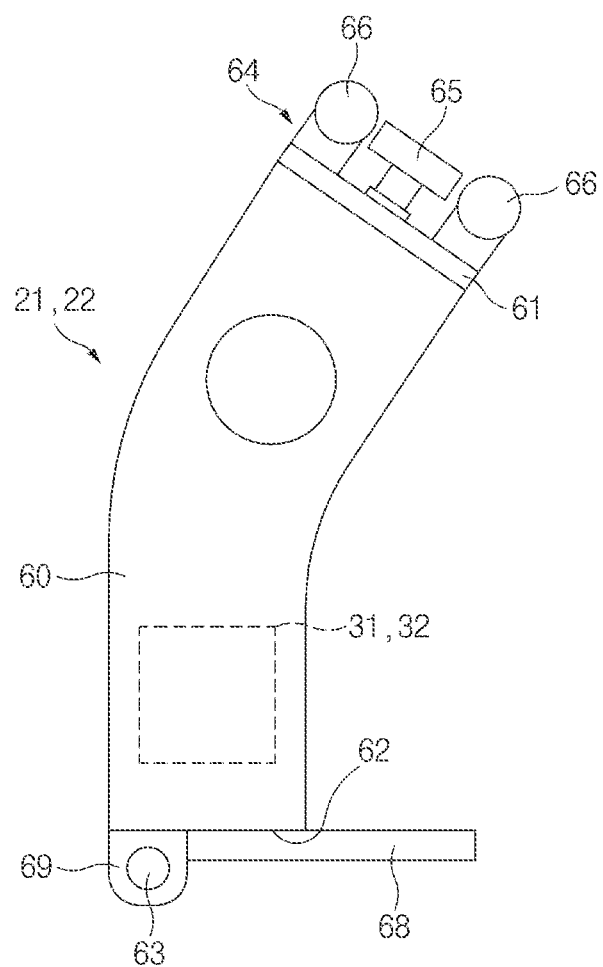
FIG. 7 illustrates an upper roller unit and a lower roller unit in a vehicle door opening and closing apparatus according to an exemplary embodiment of the present disclosure.
Figure 8:
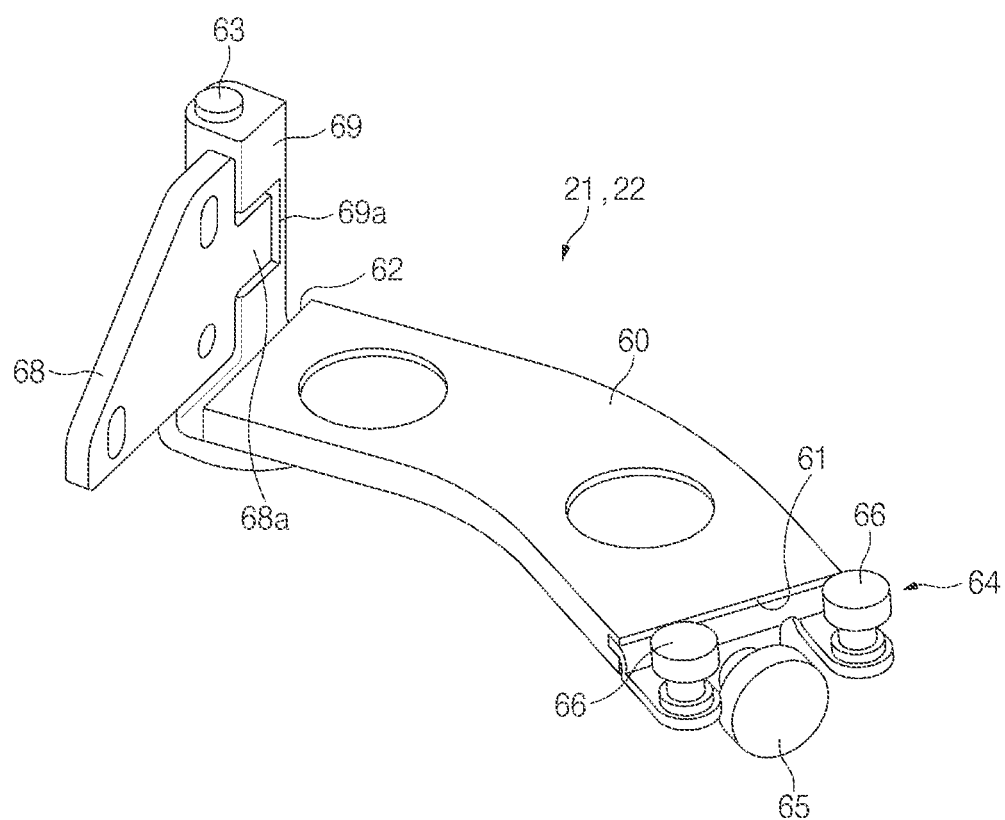
FIG. 8 illustrates a perspective view of an upper roller unit and a lower roller unit in a vehicle door opening and closing apparatus according to an exemplary embodiment of the present disclosure.

Referring to FIGS. 7 and 8, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The roller bracket 64 may rotatably support the rollers 65 and 66, and the rollers 65 and 66 may roll along the upper rail 11 and the lower rail 12. As illustrated in FIG. 8, a middle roller 65 and two side rollers 66 disposed on both sides of the middle roller 65 may be rotatably mounted on the roller bracket 64. A rotation axis of the middle roller 65 may be perpendicular to a rotation axis of the side roller 66.

The body 60 may be curved so as not to interfere with the first extension portion 51 and the second extension portion 52. The body 60 may have a first end portion 61 facing the interior of the vehicle, and a second end portion 62 facing the exterior of the vehicle. The first end portion 61 of the body 60 may be fixed to the roller bracket 64 by welding, using fasteners, and/or the like, and the second end portion 62 of the body 60 may be pivotally connected to the vehicle door 5 through a pivot pin 63. The vehicle door 5 may swing around the pivot pin 63 adjacent to the second end portion 62 of the body 60.

Referring to FIGS. 7 and 8, the roller bracket 64 may be directly connected to the first end portion 61 of the body 60 by welding, using fasteners, and/or the like, and the second end portion 62 of the body 60 may be pivotally connected to the vehicle door 5 through the pivot pin 63. A first pivot bracket 68 may be fixed to the vehicle door 5 by welding, using fasteners, and/or the like, and a second pivot bracket 69 may be fixed to the second end portion 62 of the body 60 by welding, using fasteners, and/or the like. The first pivot bracket 68 may have a lug 68a, and the second pivot bracket 69 may have a recess 69a. The lug 68a of the first pivot bracket 68 may be inserted into the recess 69a of the second pivot bracket 69, and the pivot pin 63 may pass through the lug 68a of the first pivot bracket 68 and the second pivot bracket 69. The upper rotation axis CX1 and the lower rotation axis CX2 may be defined by the pivot pin 63. For example, the upper rotation axis CX1 and the lower rotation axis CX2 may be a virtual axis extending vertically along a center point of the pivot pin 63, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

When the upper hold lock 31 firmly holds the body 60 of the upper roller unit 21 in the first closed position CP1 and the lower hold lock 32 firmly holds the body 60 of the lower roller unit 22 in the first closed position CP1, the vehicle door 5 may swing around the upper rotation axis CX1 of the upper roller unit 21 and the lower rotation axis CX2 of the lower roller unit 22. The vehicle door 5 may move between the second closed position CP2 in which the vehicle door 5 is fully closed and the second open position OP2 in which the vehicle door 5 is fully opened.

According to a specific exemplary embodiment, as illustrated in FIGS. 9 to 29, the upper hold lock 31 may selectively hold the first upper striker 31a and the second upper striker 31b, and the lower hold lock 32 may selectively hold the first lower striker 32a and the second lower striker 32b.

Figure 9:
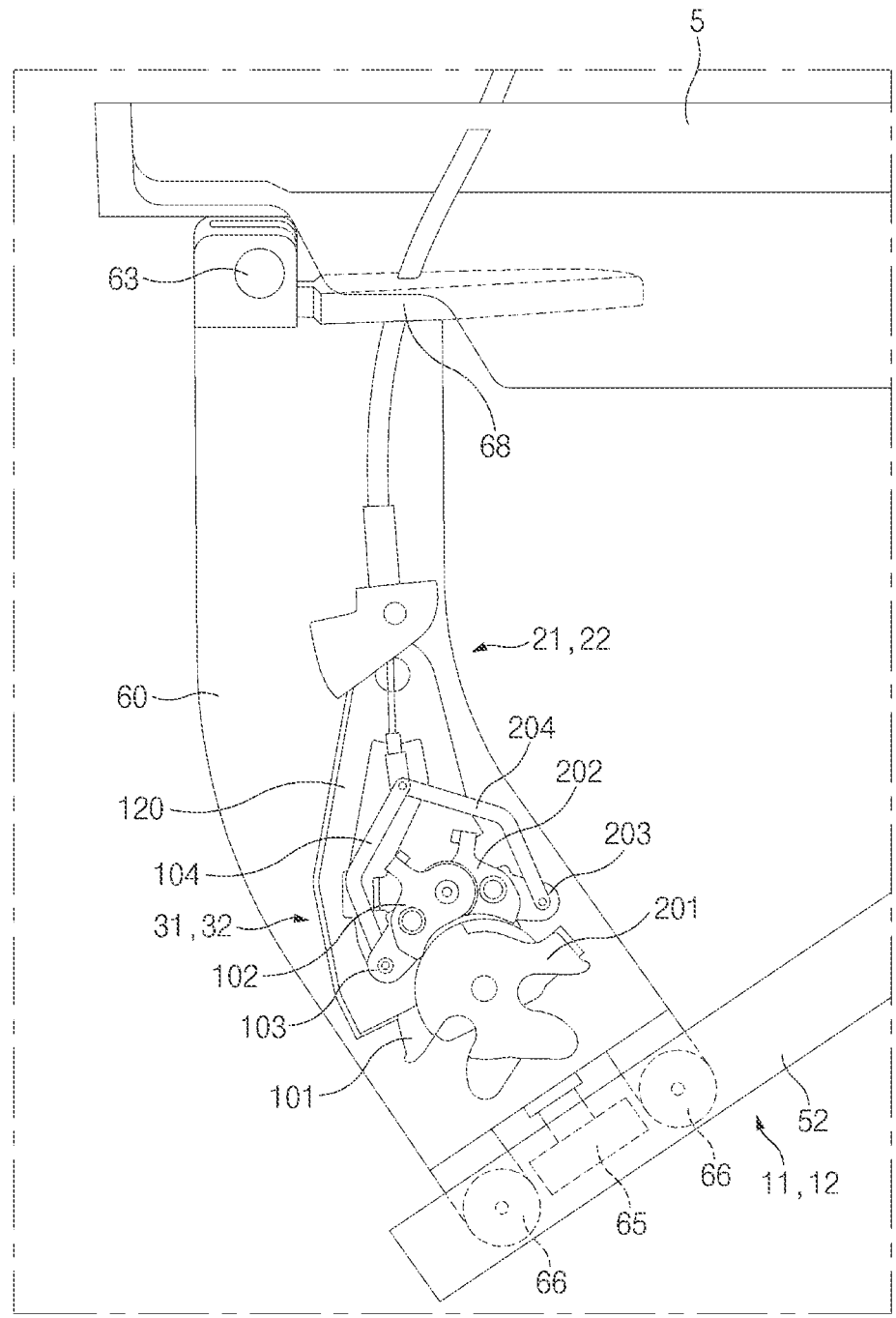
FIG. 9 illustrates a state in which a hold lock is mounted on a body of a roller unit in a vehicle door opening and closing apparatus according to an exemplary embodiment of the present disclosure.
Figure 10:
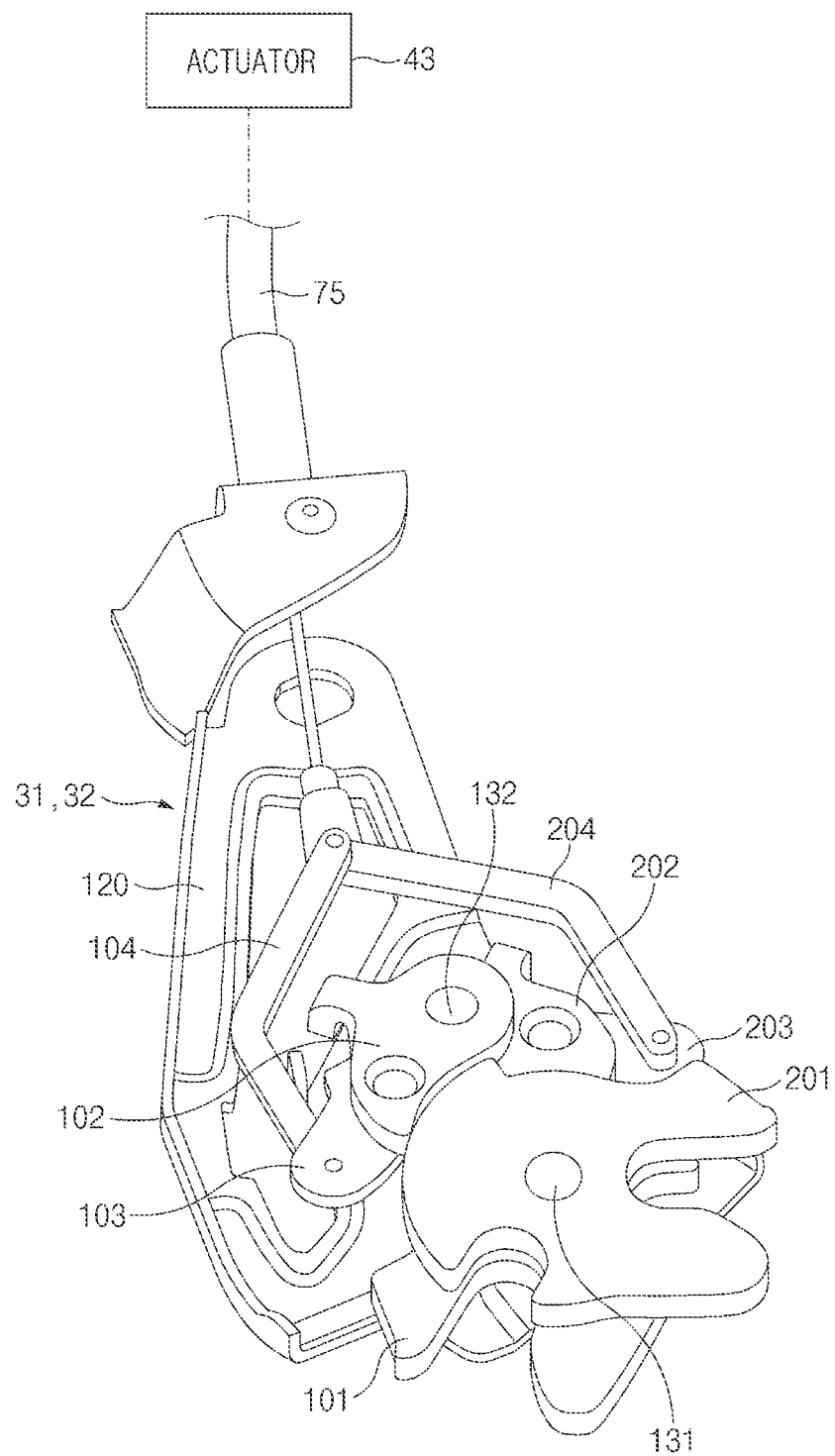
FIG. 10 illustrates a perspective view of a hold lock in a vehicle door opening and closing apparatus according to an exemplary embodiment of the present disclosure.
Figure 11:
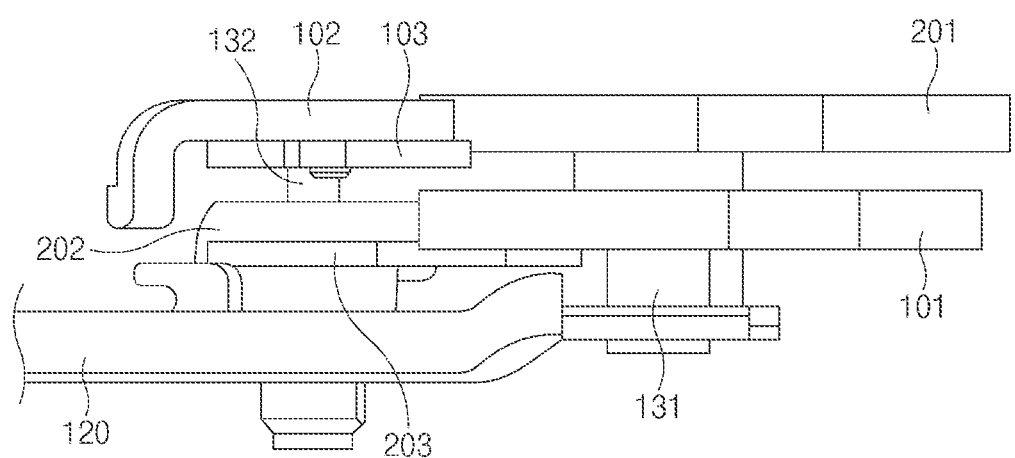
FIG. 11 illustrates a side view of the hold lock illustrated in FIG. 10.
Figure 12:
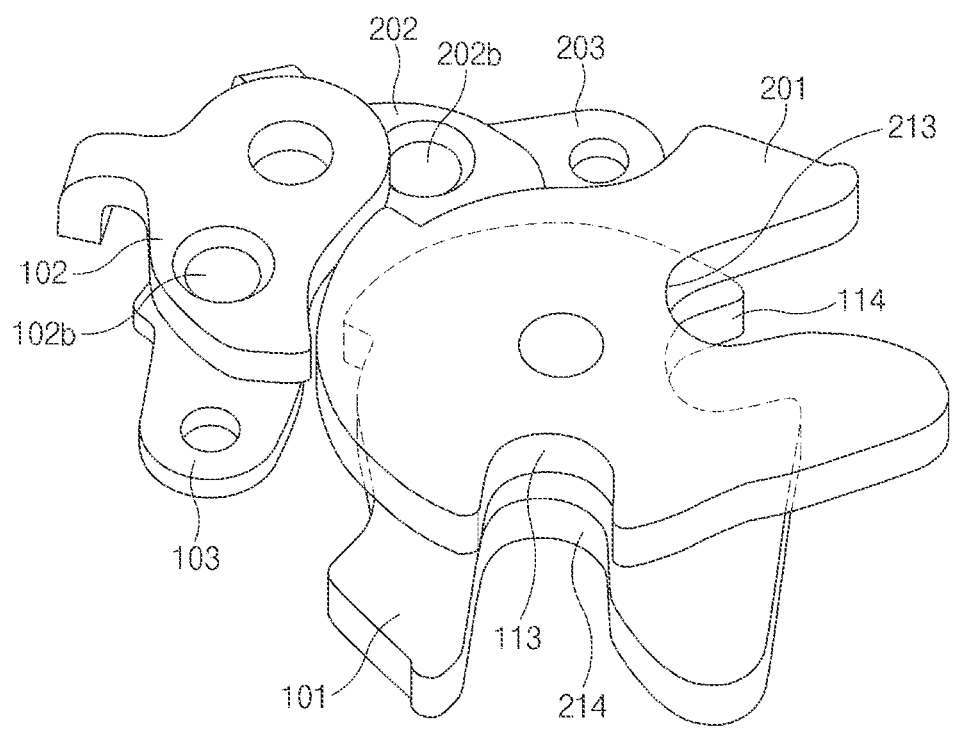
FIG. 12 illustrates a perspective view of first and second catches, first and second pawls, and first and second release levers in the hold lock illustrated in FIG. 10.
Figure 13:
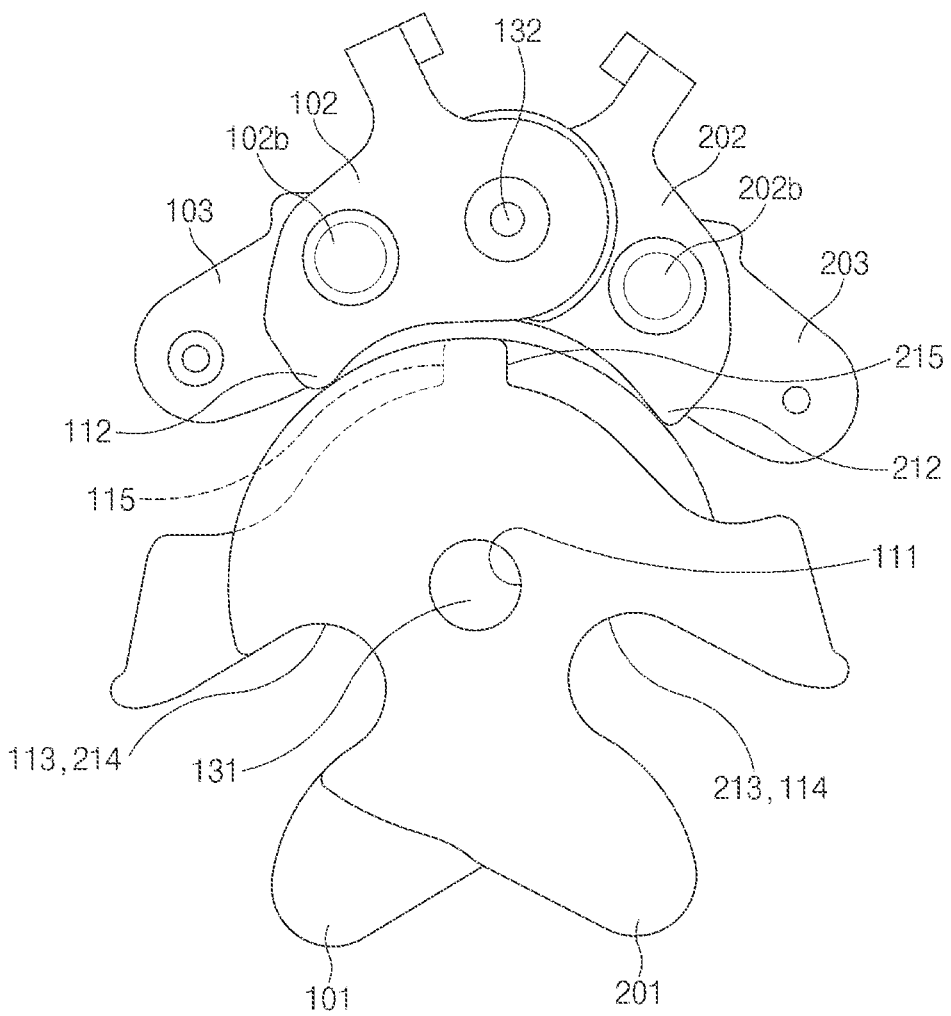
FIG. 13 illustrates a plan view of first and second catches, first and second pawls, and first and second release levers in the hold lock illustrated in FIG. 10.
Figure 14:
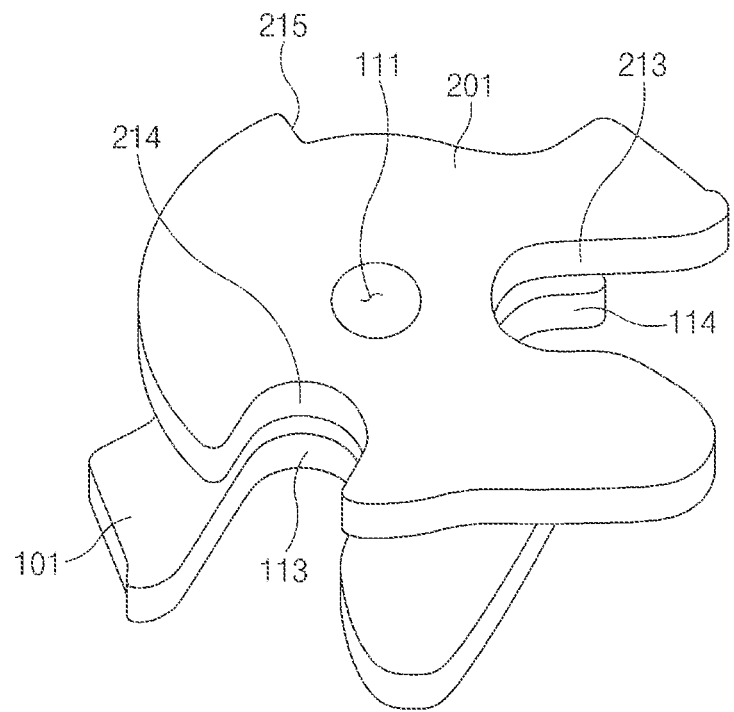
FIG. 14 illustrates first and second catches in the hold lock illustrated in FIG. 10.

Referring to FIGS. 9 and 10, each of the upper hold lock 31 and the lower hold lock 32 may include a first catch 101 releasably engaging with the first upper striker 31a and the first lower striker 32a, a first pawl 102 operatively connected to the first catch 101, a first release lever 103 operatively connected to the first pawl 102, a first pull lever 104 operatively connected to the first release lever 103, a second catch 201 releasably engaging with the second upper striker 31b and the second lower striker 32b, a second pawl 202 operatively connected to the second catch 201, a second release lever 203 operatively connected to the second pawl 202, and a second pull lever 204 operatively connected to the second release lever 203.

The first upper striker 31a and the first lower striker 32a may be aligned with or adjacent to the first closed position CP1, and the second upper striker 31b and the second lower striker 32b may be aligned with or adjacent to the first open position OP1. Thus, the first upper striker 31a may face the second upper striker 31b in the longitudinal direction of the vehicle, and the first lower striker 32a may face the second lower striker 32b in the longitudinal direction of the vehicle.

Figure 15:
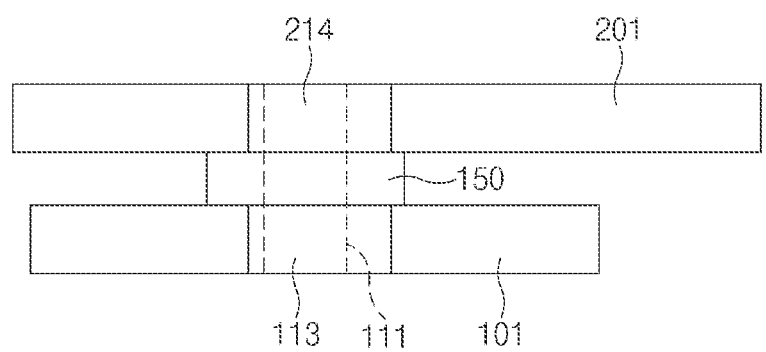
FIG. 15 illustrates a side view of the first and second catches illustrated in FIG. 14.

Referring to FIGS. 11 to 14, the first catch 101 and the second catch 201 may be spaced apart from each other in a vertical direction, and the first catch 101 and the second catch 201 may partially overlap each other. Specifically, the first catch 101 may be located below the second catch 201. Referring to FIG. 15, the first catch 101 and the second catch 201 may be integrally connected by a connection portion 150 so that the first catch 101 and the second catch 201 may form a unitary one-piece structure. A hinge hole 11 may extend through the first catch 101, the connection portion 150, and the second catch 201. Specifically, as a first hinge shaft 131 extends through the hinge hole 11, the first hinge shaft 131 may pass through the first catch 101, the connection portion 150, and the second catch 201. The first catch 101 and the second catch 201 may be pivotally mounted on a mounting plate 120 through the first hinge shaft 131, so that the first catch 101 and the second catch 201 may pivot together.

The first catch 101 may have a first main slot 113 receiving the first upper striker 31a and the first lower striker 32a, and the first catch 101 may have a first locking shoulder 115. The second catch 201 may have a second main slot 213 receiving the second upper striker 31b and the second lower striker 32b, and the second catch 201 may have a second locking shoulder 215. The first catch 101 may have a first sub-slot 114 aligned with the second main slot 213 of the second catch 201, and the second catch 201 may have a second sub-slot 214 aligned with the first main slot 113 of the first catch 101.

Figure 21:
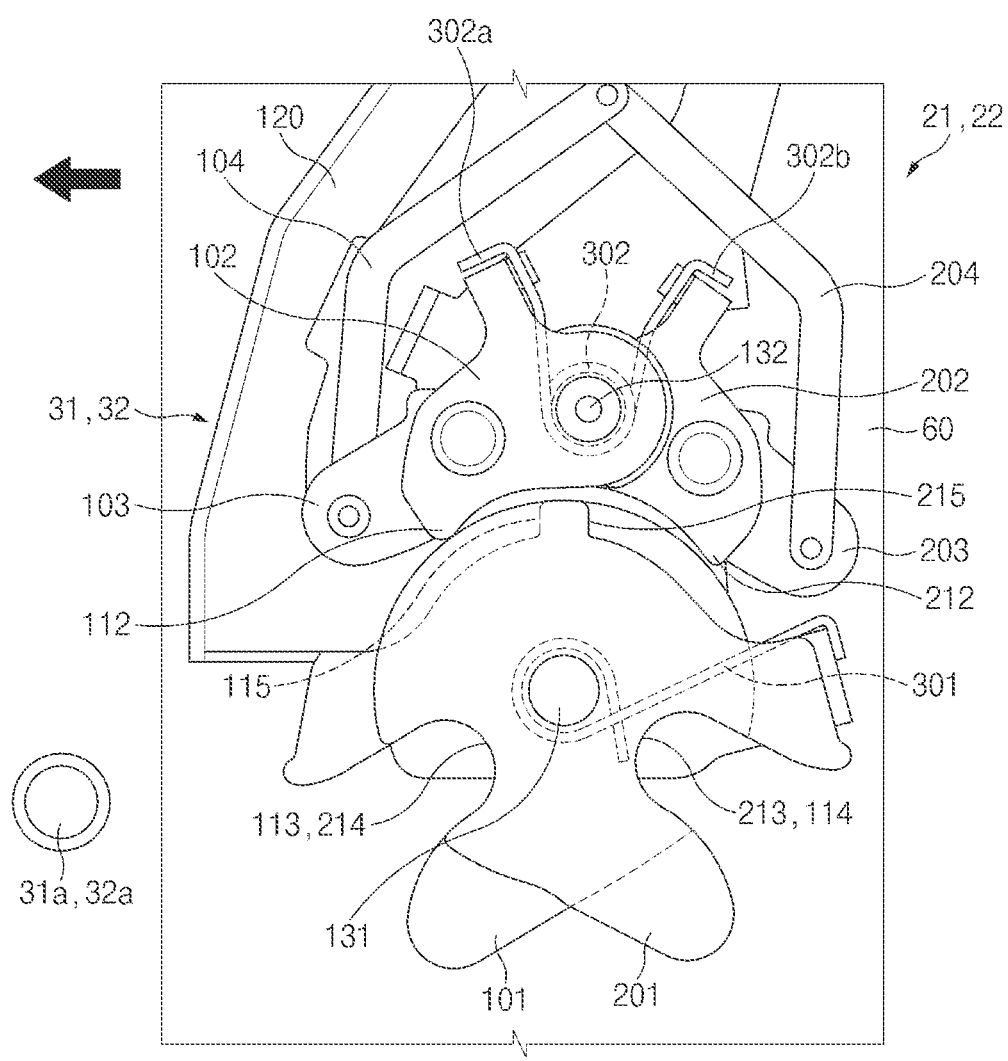
FIG. 21 illustrates a state in which a first catch of the hold lock illustrated in FIG. 10 is in a first release position.
Figure 23:
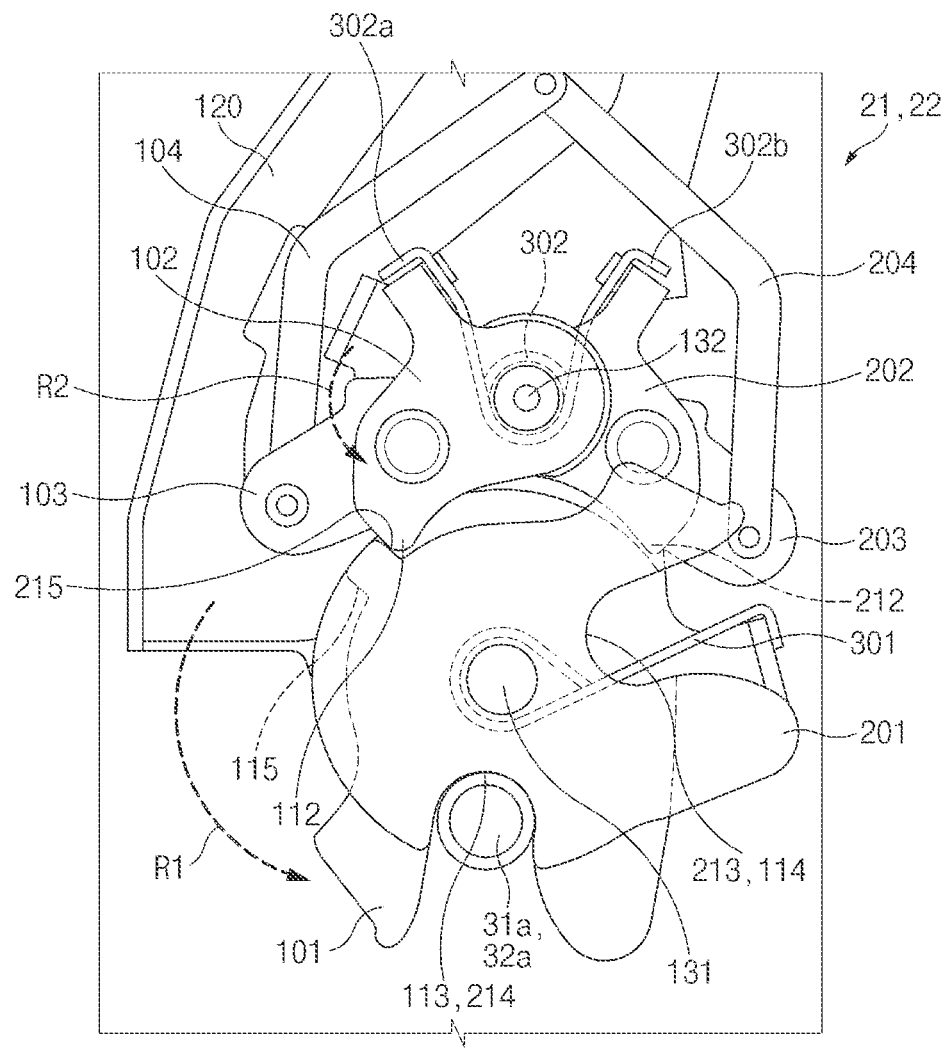
FIG. 23 illustrates a state in which a first catch fully engages with a first upper striker and a first lower striker as a vehicle door is fully moved to a first closed position.

The first catch 101 may engage with or release the first upper striker 31a and the first lower striker 32a. The first catch 101 may move between a first engaging position (see FIG. 23) and a first release position (see FIG. 21). The first engaging position refers to a position in which the first catch 101 engages with the first upper striker 31a and the first lower striker 32a in the first closed position CP1 as illustrated in FIG. 23, and the first release position refers to a position in which the first catch 101 releases the first upper striker 31a and the first lower striker 32a as illustrated in FIG. 21. When the first catch 101 is in the first engaging position as illustrated in FIG. 23, the first catch 101 may engage with the first upper striker 31a and the first lower striker 32a so that the upper roller unit 21 and the lower roller unit 22 of the vehicle door 5 may be held in the first closed position CP1. When the first catch 101 is in the first release position as illustrated in FIG. 21, the first catch 101 may release the first upper striker 31a and the first lower striker 32a so that the first upper striker 31a may be released from the first main slot 113 of the first catch 101 of the upper hold lock 31 or be received in the first main slot 113 of the first catch 101 of the upper hold lock 31, and the first lower striker 32a may be released from the first main slot 113 of the first catch 101 of the lower hold lock 32 or be received in the first main slot 113 of the first catch 101 of the lower hold lock 32.

Figure 24:
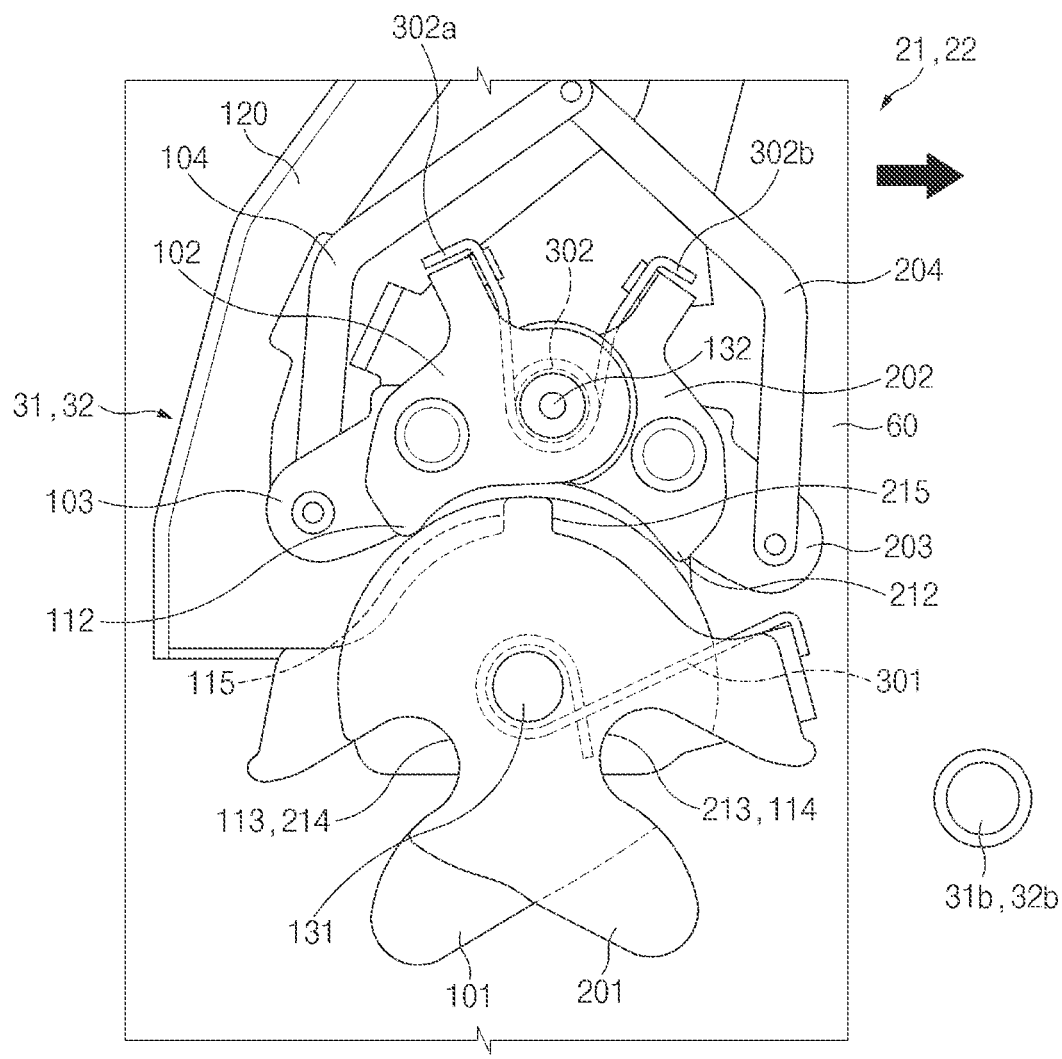
FIG. 24 illustrates a state in which a second catch of the hold lock illustrated in FIG. 10 is in a second release position.
Figure 26:
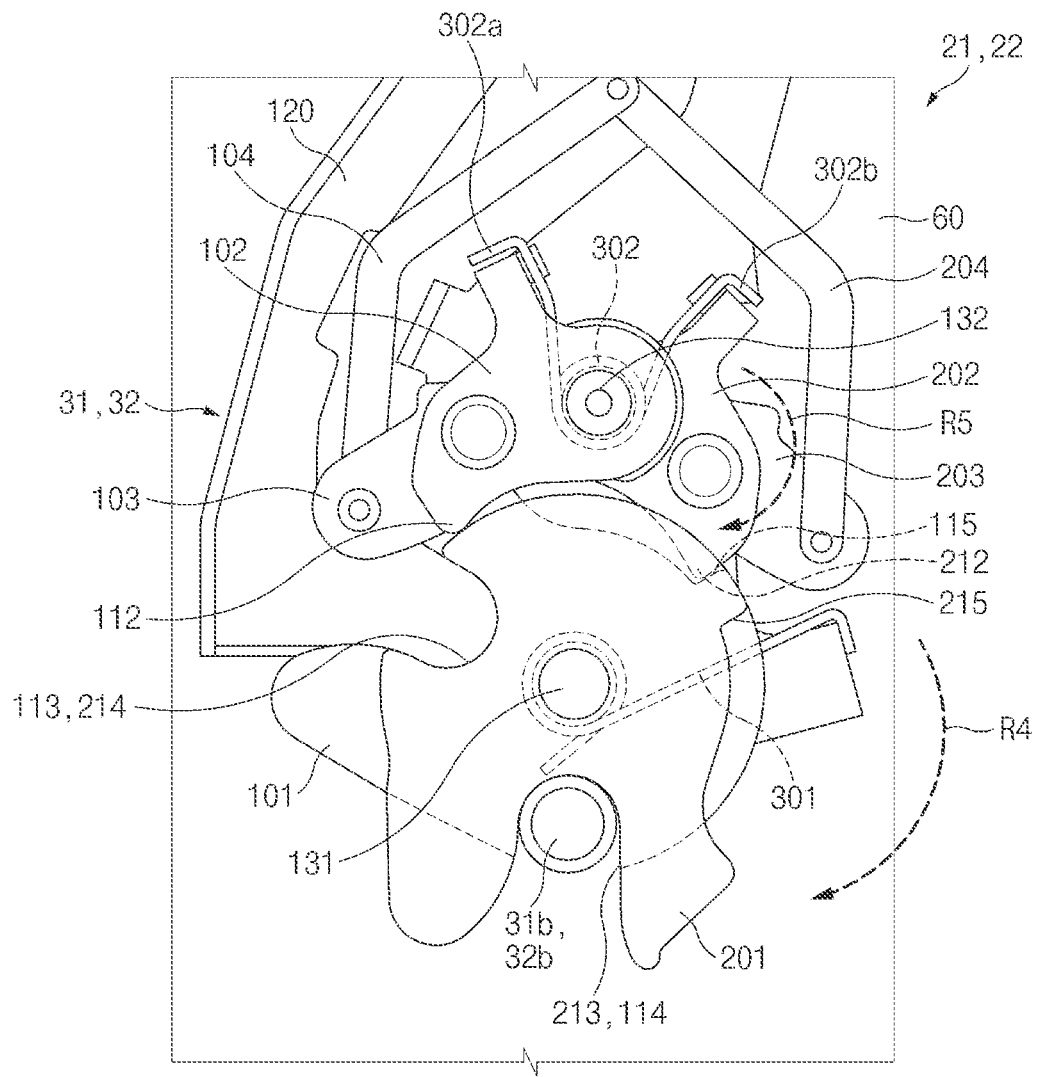
FIG. 26 illustrates a state in which a second catch fully engages with a second upper striker and a second lower striker as a vehicle door is fully moved to a first open position.
Figure 27:
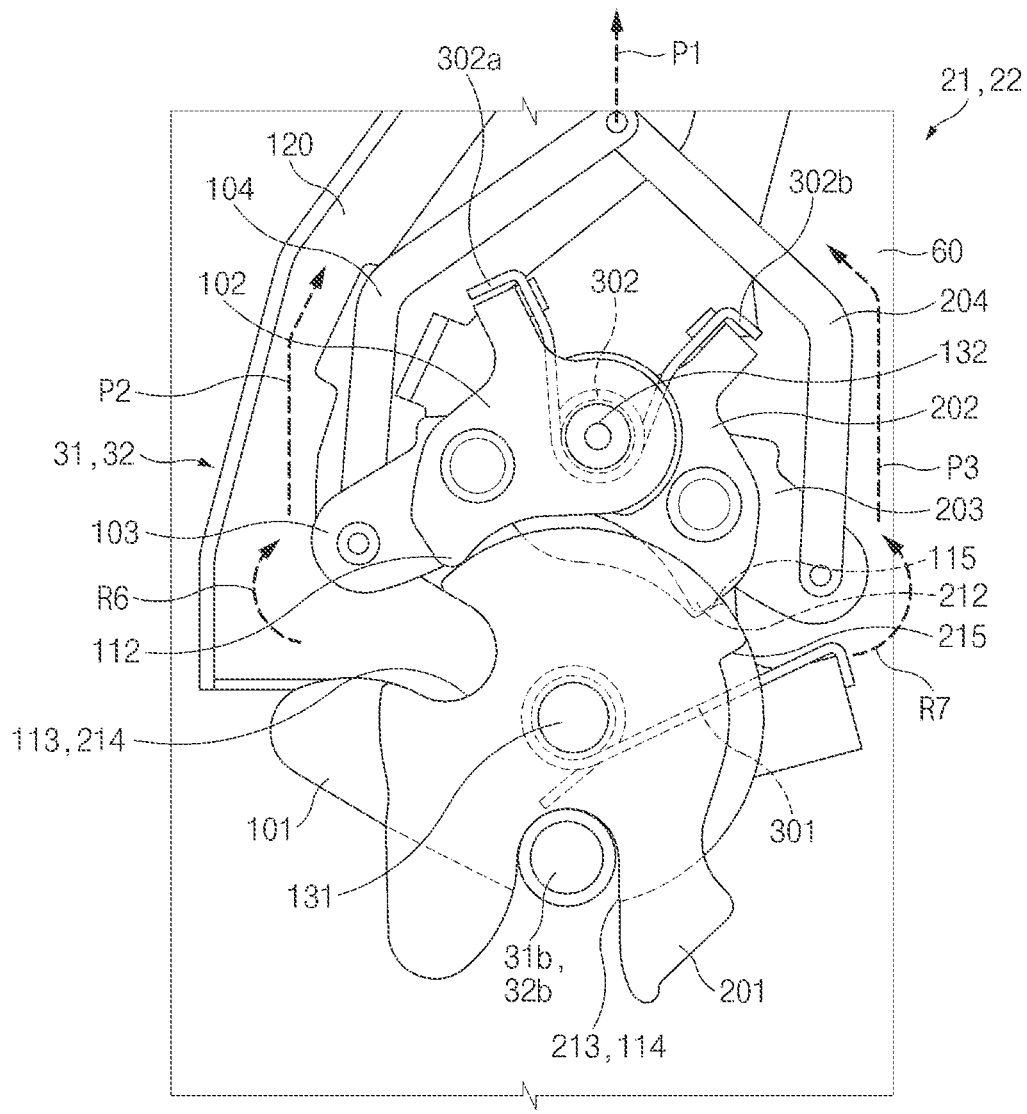
FIG. 27 illustrates a state in which first and second release levers pivot in a direction of movement of first and second pull levers as the first and second pull levers are pulled by a cable.

The second catch 201 may engage with or release the second upper striker 31b and the second lower striker 32b. The second catch 201 may move between a second engaging position (see FIG. 26) and a second release position (see FIG. 24). The second engaging position refers to a position in which the second catch 201 engages with the second upper striker 31b and the second lower striker 32b in the first open position OP1 as illustrated in FIG. 26, and the second release position refers to a position in which the second catch 201 releases the second upper striker 31b and the second lower striker 32b as illustrated in FIG. 24. The second release position (see FIG. 24) may be substantially the same as the first release position (see FIG. 21). When the second catch 201 is in the second engaging position as illustrated in FIG. 26, the second catch 201 may engage with the second upper striker 31b and the second lower striker 32b so that the upper roller unit 21 and the lower roller unit 22 of the vehicle door 5 may be held in the first open position OP1. When the second catch 201 is in the second release position as illustrated in FIG. 24, the second catch 201 may release the second upper striker 31b and the second lower striker 32b so that the second upper striker 31b may be released from the second main slot 213 of the second catch 201 of the upper hold lock 31 or be received in the second main slot 213 of the second catch 201 of the upper hold lock 31, and the second lower striker 32b may be released from the second main slot 213 of the second catch 201 of the lower hold lock 32 or be received in the second main slot 213 of the second catch 201 of the lower hold lock 32.

The first catch 101 and the second catch 201 may be biased to the first and second release positions by a first biasing element 301 such as a torsion spring, respectively. The first biasing element 301 may be disposed around the first hinge shaft 131.

Figure 16:
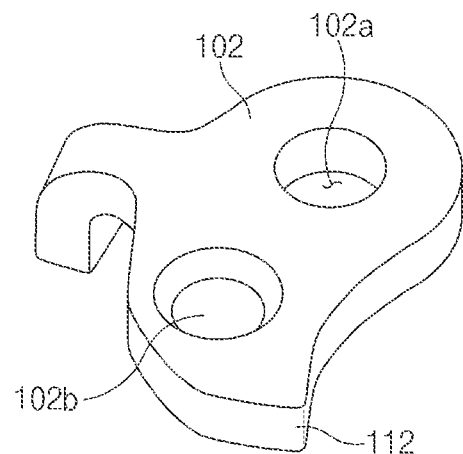
FIG. 16 illustrates a perspective view of a first pawl in the hold lock illustrated in FIG. 10.
Figure 17:
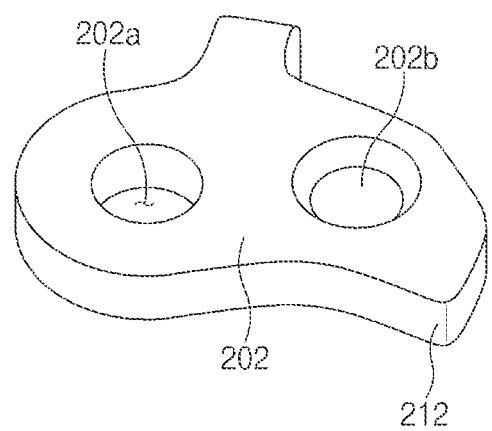
FIG. 17 illustrates a perspective view of a second pawl in the hold lock illustrated in FIG. 10.

The first pawl 102 and the second pawl 202 may be pivotally mounted on the mounting plate 120 through a second hinge shaft 132. The first pawl 102 may be located above the second pawl 202. The first pawl 102 may be aligned with the second catch 201, and the second pawl 202 may be aligned with the first catch 101. Referring to FIG. 16, the first pawl 102 may have a hinge hole 102a into which the second hinge shaft 132 is inserted, and a first locking projection 112 releasably locked to the second locking shoulder 215 of the second catch 201. Referring to FIG. 17, the second pawl 202 may have a hinge hole 202a into which the second hinge shaft 132 is inserted, and a second locking projection 212 releasably locked to the first locking shoulder 115 of the first catch 101.

The first pawl 102 may move between a first pawl locking position (see FIG. 23) and a first pawl release position (see FIG. 21). As illustrated in FIG. 23, the first pawl locking position refers to a position in which the first locking projection 112 of the first pawl 102 is locked to the second locking shoulder 215 of the second catch 201. As illustrated in FIG. 21, the first pawl release position refers to a position in which the first locking projection 112 of the first pawl 102 is released from the second locking shoulder 215 of the second catch 201. As illustrated in FIG. 23, when the first pawl 102 is in the first pawl locking position, the first locking projection 112 of the first pawl 102 may be locked to the second locking shoulder 215 of the second catch 201 so that the movement (rotation) of the first catch 101 and the second catch 201 forming the unitary one-piece structure may be restricted by the first pawl 102, and thus the first catch 101 may be kept in the first engaging position. As illustrated in FIG. 21, when the first pawl 102 is in the first pawl release position, the movement (rotation) of the first catch 101 and the second catch 201 may not be restricted by the first pawl 102, and thus the first catch 101 may move from the first engaging position to the first release position. The first pawl 102 may be aligned with the second catch 201 at the same height. As the first locking projection 112 of the first pawl 102 is locked to the second locking shoulder 215 of the second catch 201, the first catch 101 may not interfere with the first pawl 102.

The second pawl 202 may move between a second pawl locking position (see FIG. 26) and a second pawl release position (see FIG. 24). As illustrated in FIG. 26, the second pawl locking position refers to a position in which the second locking projection 212 of the second pawl 202 is locked to the first locking shoulder 115 of the first catch 101. As illustrated in FIG. 24, the second pawl release position refers to a position in which the second locking projection 212 of the second pawl 202 is released from the first locking shoulder 115 of the first catch 101. As illustrated in FIG. 26, when the second pawl 202 is in the second pawl locking position, the second locking projection 212 of the second pawl 202 may be locked to the first locking shoulder 115 of the first catch 101 so that the movement (rotation) of the first catch 101 and the second catch 201 forming the unitary one-piece structure may be restricted by the second pawl 202, and thus the second catch 201 may be kept in the second engaging position. As illustrated in FIG. 24, when the second pawl 202 is in the second pawl release position, the movement (rotation) of the first catch 101 and the second catch 201 may not be restricted by the second pawl 202, and thus the second catch 201 may move from the second engaging position to the second release position. The second pawl 202 may be aligned with the first catch 101 at the same height. As the second locking projection 212 of the second pawl 202 is locked to the first locking shoulder 115 of the first catch 101, the second catch 201 may not interfere with the second pawl 202.

The first pawl 102 and the second pawl 202 may be biased to the first pawl locking position (see FIG. 23) and the second pawl locking position (see FIG. 26) by a second biasing element 302 such as a torsion spring, respectively. The second biasing element 302 may be disposed around the second hinge shaft 132, and the second biasing element 302 may have a first elastic leg 302a supported to the first pawl 102 and a second elastic leg 302b supported to the second pawl 202.

Figure 18:
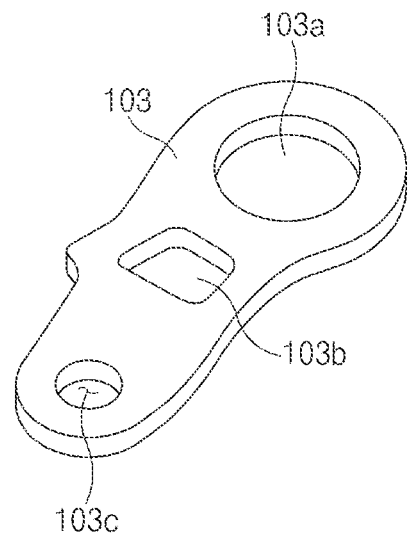
FIG. 18 illustrates a perspective view of a first release lever in the hold lock illustrated in FIG. 10.
Figure 19:
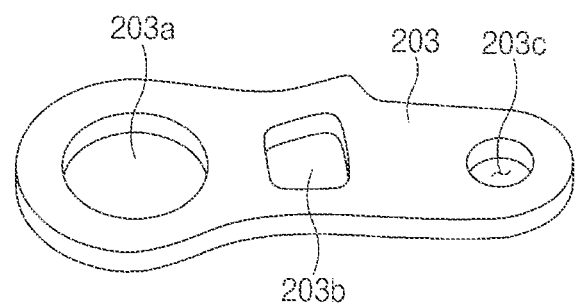
FIG. 19 illustrates a perspective view of a second release lever in the hold lock illustrated in FIG. 10.

The first release lever 103 and the second release lever 203 may be pivotally mounted on the mounting plate 120 through the second hinge shaft 132. That is, the first pawl 102, the second pawl 202, the first release lever 103, and the second release lever 203 may be pivotally mounted on the mounting plate 120 by the second hinge shaft 132. Referring to FIG. 18, the first release lever 103 may have a hinge hole 103a into which the second hinge shaft 132 is inserted, and a pivot hole 103c to which the first pull lever 104 is pivotally hinge-coupled. Referring to FIG. 16, the first pawl 102 may have a bead 102b protruding toward the first release lever 103. Referring to FIG. 18, the first release lever 103 may have a slot 103b into which the bead 102b of the first pawl 102 is inserted. Thus, the first release lever 103 may pivot with the first pawl 102 in the same direction. Referring to FIG. 19, the second release lever 203 may have a hinge hole 203a into which the second hinge shaft 132 is inserted, and a pivot hole 203c to which the second pull lever 204 is pivotally hinge-coupled. Referring to FIG. 17, the second pawl 202 may have a bead 202b protruding toward the second release lever 203. Referring to FIG. 19, the second release lever 203 may have a slot 203b into which the bead 202b of the second pawl 202 is inserted. Thus, the second release lever 203 may pivot with the second pawl 202 in the same direction.

The first pull lever 104 may be pivotally connected to the first release lever 103, and the second pull lever 204 may be pivotally connected to the second release lever 203. The first pull lever 104 and the second pull lever 204 may be connected to a cable 75, and the cable 75 may be connected to the actuator 43 or the outside handle 6. As the cable 75 is pulled by the actuator 43 or the outside handle 6, the first catch 101 of the upper hold lock 31 and the first catch 101 of the lower hold lock 32 may release the first upper striker 31a and the first lower striker 32a, and the second catch 201 of the upper hold lock 31 and the second catch 201 of the lower hold lock 32 may release the second upper striker 31b and the second lower striker 32b.

Figure 20:
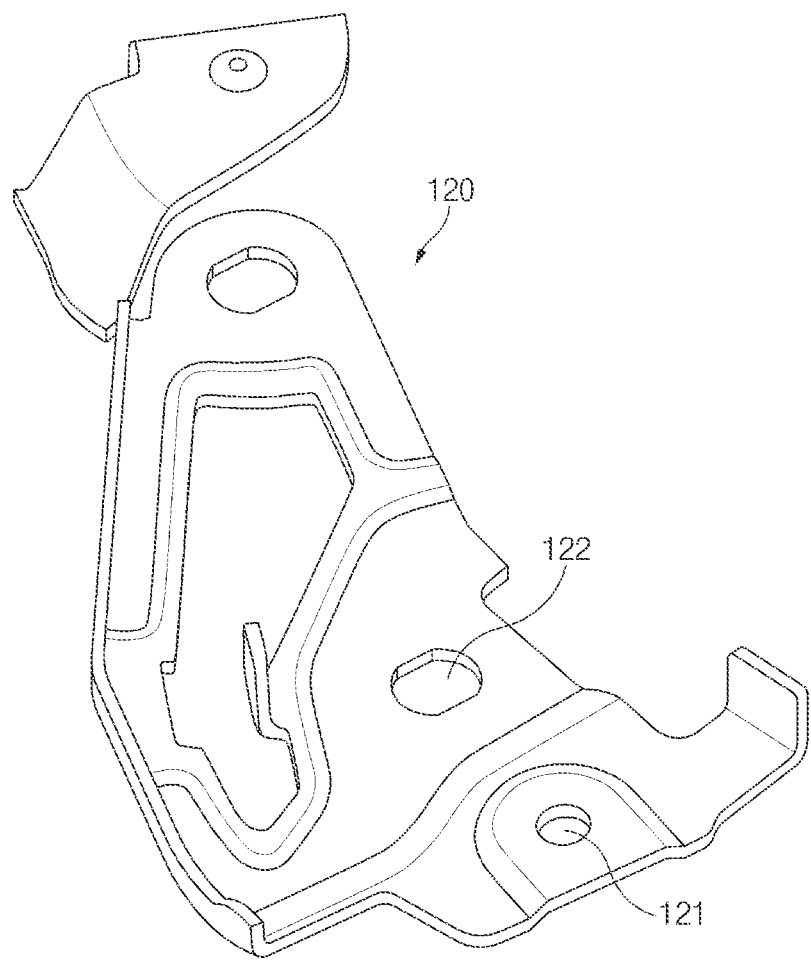
FIG. 20 illustrates a perspective view of a mounting plate for the hold lock illustrated in FIG. 10.

Referring to FIG. 20, the mounting plate 120 may have a first through hole 121 to which the first hinge shaft 131 is mounted, and a second through hole 122 to which the second hinge shaft 132 is mounted.

When the vehicle door 5 is closed in the sliding mode (that is, the vehicle door 5 is moved to the first closed position CP1), as illustrated in FIG. 21, the bodies 60 of the roller units 21 and 22 may move toward the first upper striker 31a and the first lower striker 32a, and the first main slot 113 of the first catch 101 and the second sub-slot 214 of the second catch 201 may be open to the first upper striker 31a and the first lower striker 32a. The first catch 101 may be in the first release position, and the first pawl 102 may be in the first pawl release position.

Figure 22:
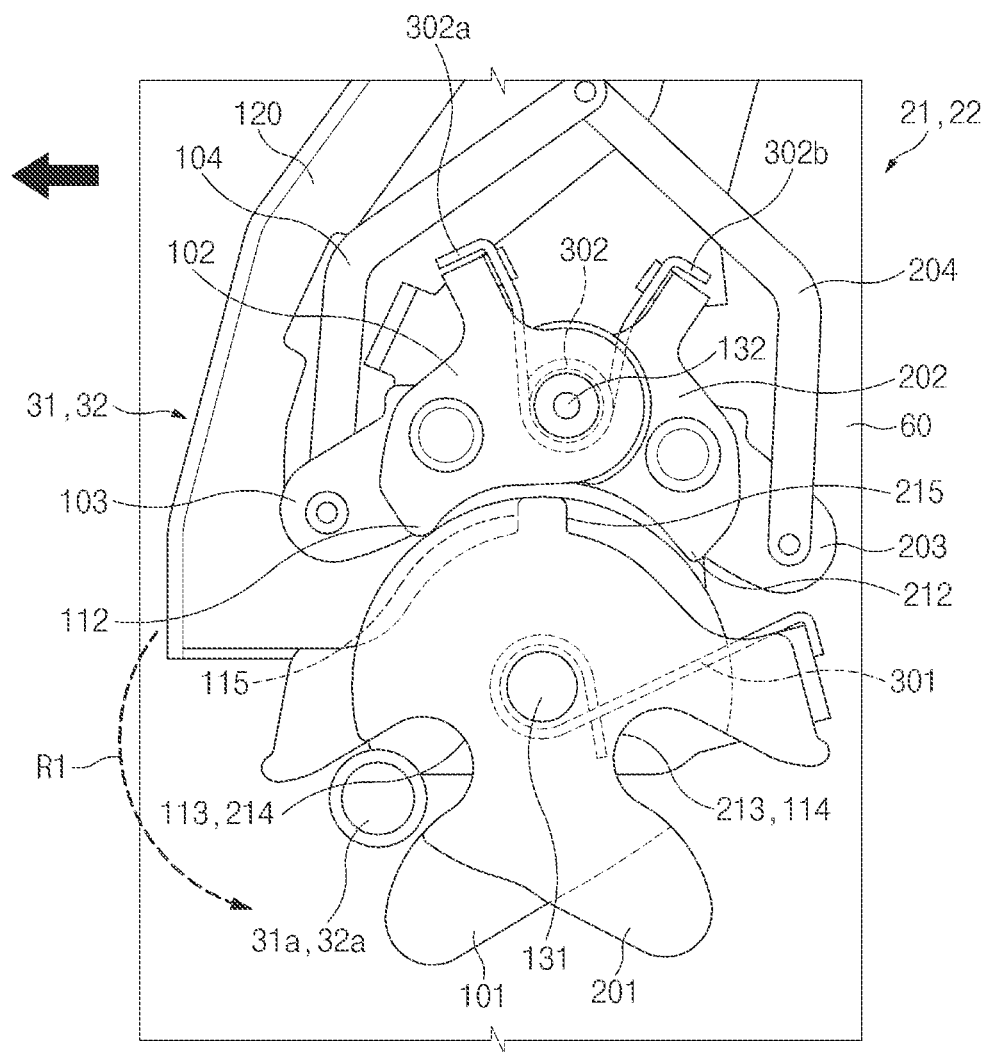
FIG. 22 illustrates a state in which a first catch starts to engage with a first upper striker and a first lower striker as a vehicle door approaches a first closed position.

As the vehicle door 5 approaches the first closed position CP1, as illustrated in FIG. 22, the bodies 60 of the roller units 21 and 22 may move close to the first upper striker 31a and the first lower striker 32a, and accordingly the first upper striker 31a and the first lower striker 32a may start to be received in the first main slot 113 of the first catch 101 and the second sub-slot 214 of the second catch 201, and the first catch 101 and the second catch 201 may pivot around the first hinge shaft 131 in a counterclockwise direction (see arrow R1 of FIG. 22).

Thereafter, when the vehicle door 5 is fully moved to the first closed position CP1, as illustrated in FIG. 23, the first catch 101 and the second catch 201 may fully rotate around the first hinge shaft 131, and the first pawl 102 may be biased to the first pawl locking position by the second biasing element 302, and accordingly the first locking projection 112 of the first pawl 102 may be locked to the second locking shoulder 215 of the second catch 201. As the first catch 101 fully engages with the first upper striker 31a and the first lower striker 32a by a biasing force of the second biasing element 302, the roller units 21 and 22 of the vehicle door 5 may be held in the first closed position CP1.

In a state in which the roller units 21 and 22 of the vehicle door 5 are held in the first closed position CP1, the user may open and close the vehicle door 5 in the swing mode. After the vehicle door 5 is closed in the swing mode, the user may select the first switch 41 of the selector 40 to open and close the vehicle door 5 in the sliding mode. As the cable 75 is pulled by the release operation of the actuator 43, the first pull lever 104 and the second pull lever 204 may move away from the first catch 101 and the second catch 201, and accordingly the first pawl 102 may move to the first pawl release position, and the second pawl 202 may move to the second pawl release position. The first catch 101 and the second catch 201 may move to the first release position and the second release position by a biasing force of the first biasing element 301, and the first catch 101 may release the first upper striker 31a and the first lower striker 32a.

When the vehicle door 5 is opened in the sliding mode (that is, the vehicle door 5 is moved to the first open position OP1), as illustrated in FIG. 24, the bodies 60 of the roller units 21 and 22 may move toward the second upper striker 31b and the second lower striker 32b, and the second main slot 213 of the second catch 201 and the first sub-slot 114 of the first catch 101 may be open to the second upper striker 31b and the second lower striker 32b. The second catch 201 may be in the second release position, and the second pawl 202 may be in the second pawl release position.

Figure 25:
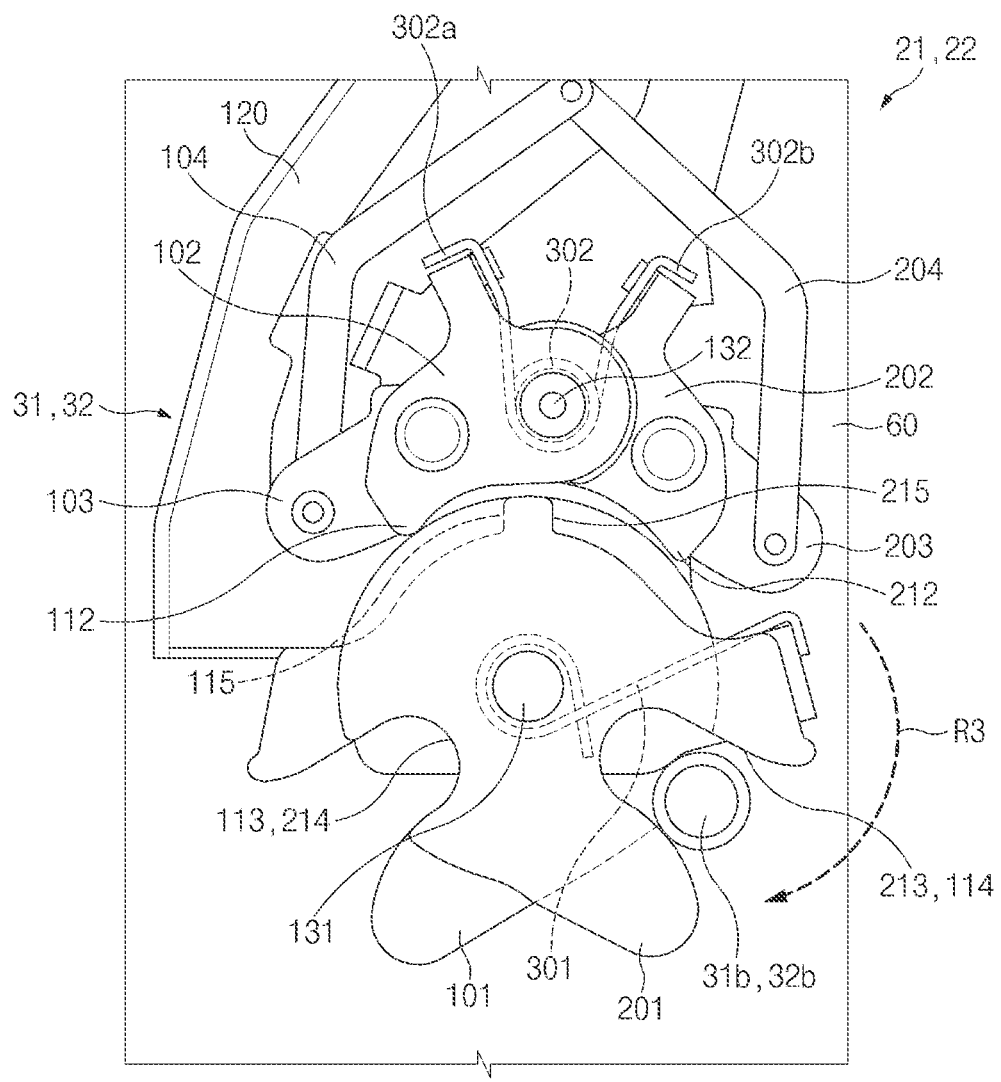
FIG. 25 illustrates a state in which a second catch starts to engage with a second upper striker and a second lower striker as a vehicle door approaches a first open position.

As illustrated in FIG. 25, as the bodies 60 of the roller units 21 and 22 move close to the second upper striker 31b and the second lower striker 32b, the second upper striker 31b and the second lower striker 32b may start to be received in the second main slot 213 of the second catch 201 and the first sub-slot 114 of the first catch 101, and the second catch 201 and the first catch 101 may pivot around the first hinge shaft 131 in a clockwise direction (see arrow R3 of FIG. 25).

Thereafter, when the vehicle door 5 is fully moved to the first open position OP1, as illustrated in FIG. 26, the second catch 201 and the first catch 101 may fully rotate around the first hinge shaft 131, and the second pawl 202 may be biased to the second pawl locking position by the second biasing element 302, and accordingly the second locking projection 212 of the second pawl 202 may be locked to the first locking shoulder 115 of the first catch 101. As the second catch 201 fully engages with the second upper striker 31b and the second lower striker 32b by a biasing force of the second biasing element 302, the roller units 21 and 22 of the vehicle door 5 may be held in the first open position OP1.

In order for the second catch 201 to release the second upper striker 31b and the second lower striker 32b in a state in which the vehicle door 5 is fully opened in the sliding mode and the roller units 21 and 22 of the vehicle door 5 are held in the first open position OP1, when the user pulls the outside handle 6, the cable 75 may be pulled by the release operation of the actuator 43. The first pull lever 104 may move away from the first catch 101 (see arrow P2 of FIG. 27) in a pulling direction P1 of the cable 75, and the second pull lever 204 may move away from the second catch 201 (see arrow P3 of FIG. 27) in the pulling direction P1 of the cable 75. The first release lever 103 may pivot clockwise (see arrow R6 of FIG. 27) in the movement direction (see arrow P2) of the first pull lever 104, and the second release lever 203 may pivot counterclockwise (see arrow R7 of FIG. 27) in the movement direction (see arrow P3) of the second pull lever 204.

Figure 28:
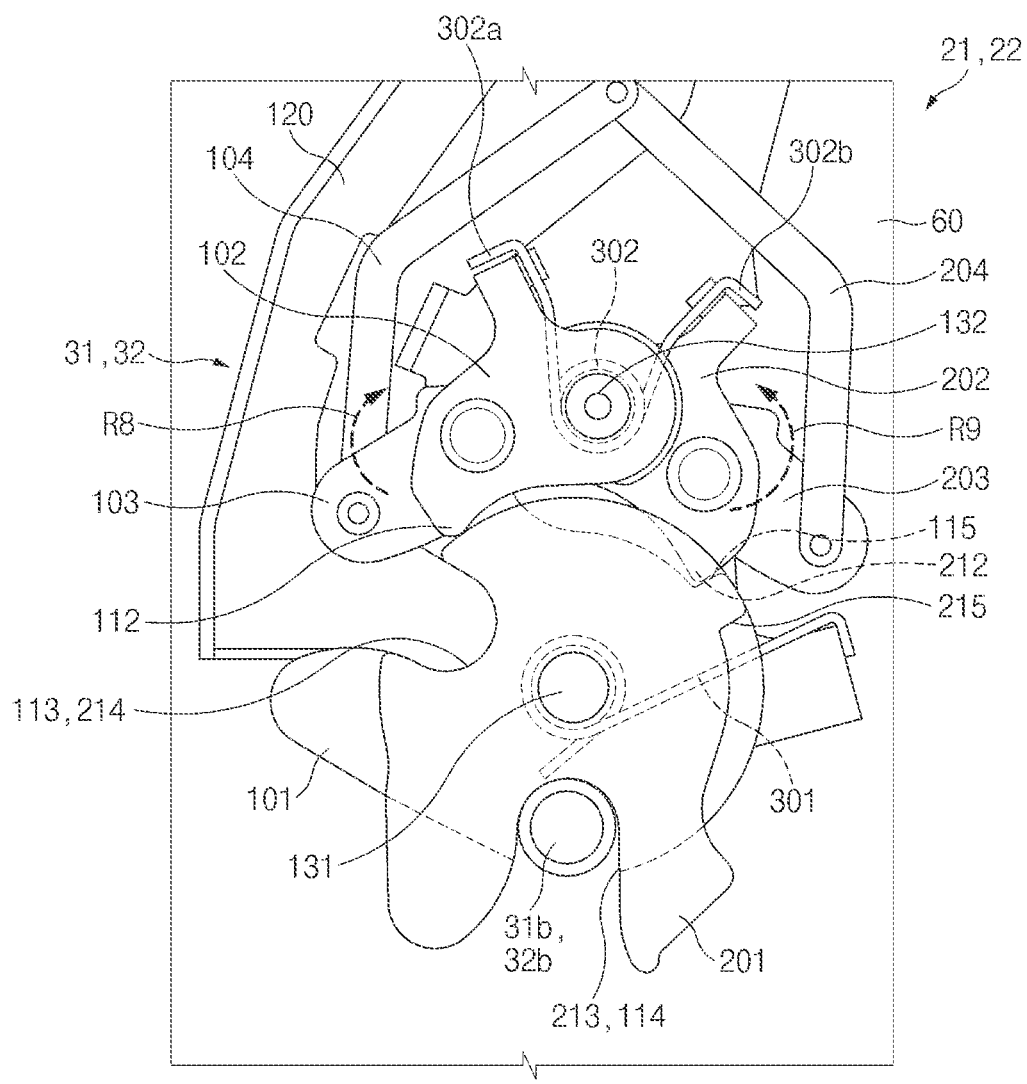
FIG. 28 illustrates a state in which first and second pawls move to first and second pawl release positions as first and second release levers pivot.
Figure 29:
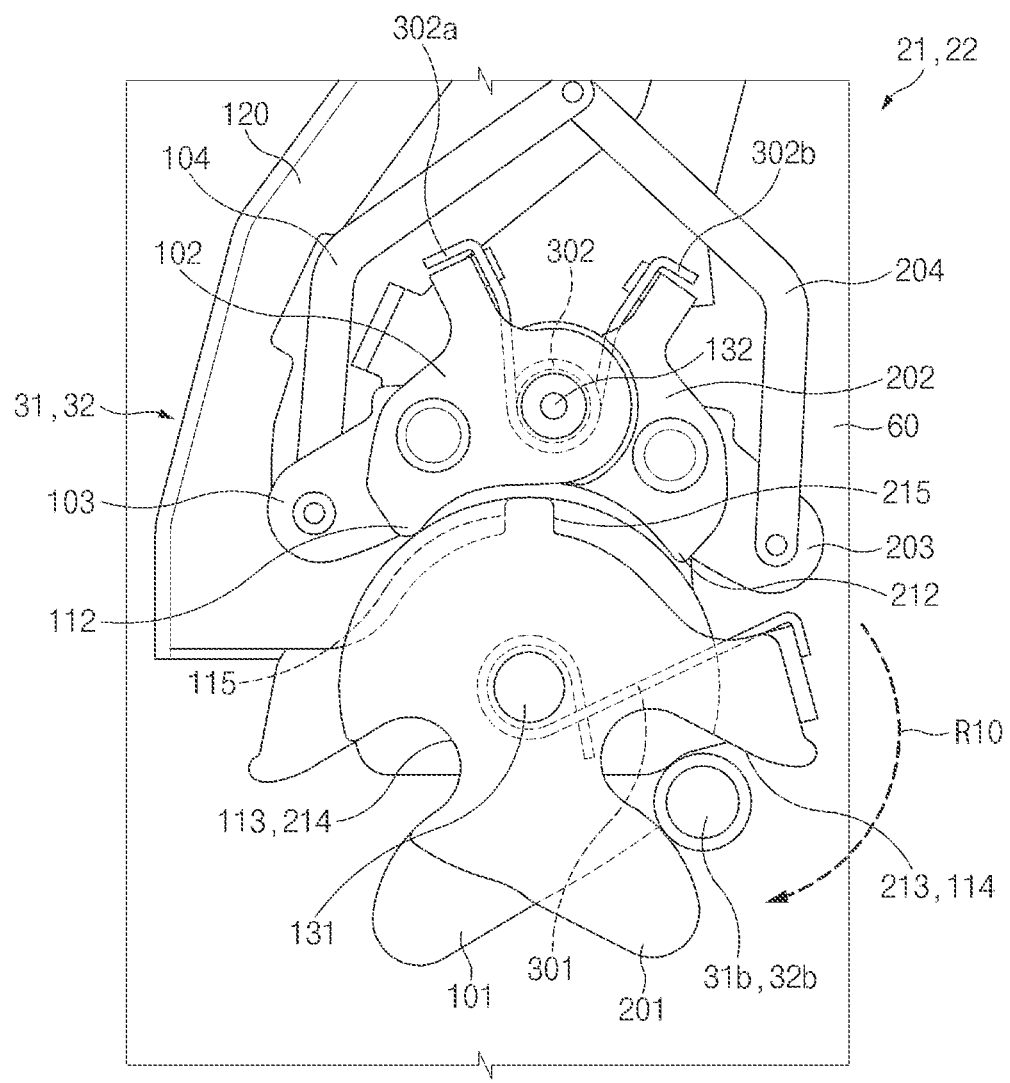
FIG. 29 illustrates a state in which first and second catches move to first and second release positions as first and second pawls move to first and second pawl release positions.

Referring to FIG. 28, the first pawl 102 may pivot clockwise (see arrow R8 of FIG. 28) in the same manner as the first release lever 103, and the second pawl 202 may pivot counterclockwise (see arrow R9 of FIG. 28) in the same manner as the second release lever 203. Referring to FIG. 29, as the second biasing element 302 is compressed, the first pawl 102 may move to the first pawl release position, and the second pawl 202 may move to the second pawl release position. The first catch 101 and the second catch 201 may move to the first release position and the second release position by the first biasing element 301 (see arrow Rio of FIG. 29).

Figure 30:
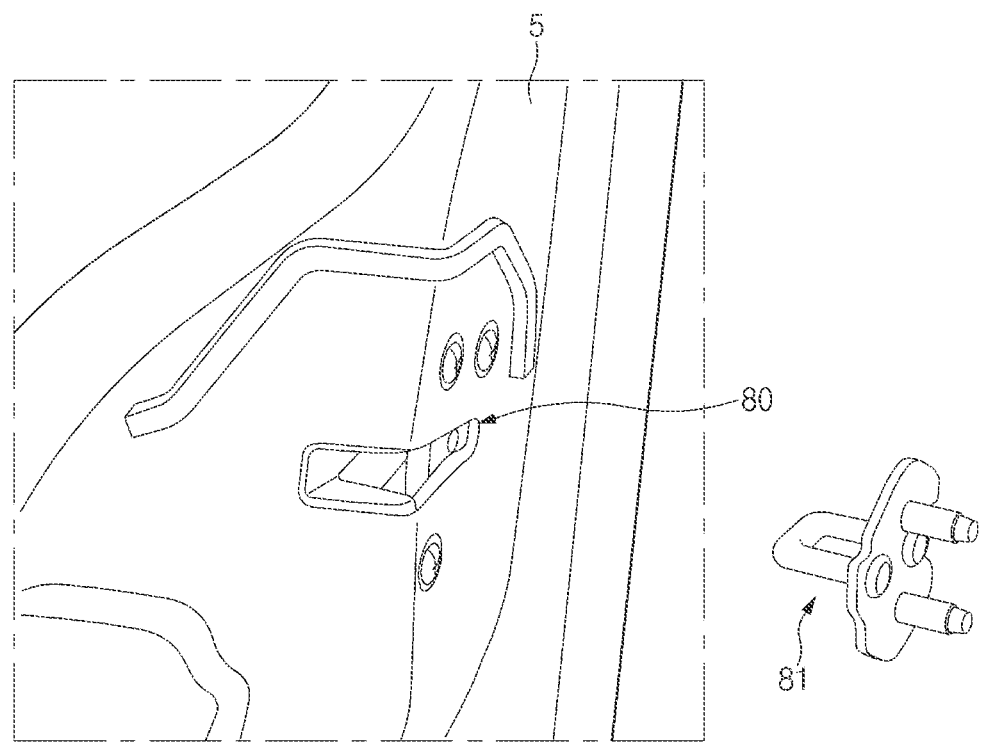
FIG. 30 illustrates a main latch mounted on a vehicle door and a main striker.

Referring to FIG. 30, a main latch 80 may be mounted on a rear end of the vehicle door 5, and a main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the main latch 8o may release the main striker 81 by a release operation of the outside handle 6 so that the vehicle door 5 may be allowed to move in the sliding mode or the swing mode. When the vehicle door 5 is held in the first closed position CP1 and the main latch 8o releases the main striker 81, a center roller unit 23 may be released from the center rail 13, and thus the vehicle door 5 may be opened and closed in the swing mode.

The vehicle door opening and closing apparatus, according to exemplary embodiments of the present disclosure, may further include the center rail 13 mounted at a central portion of the vehicle body 1, and the center roller unit 23 guided along the center rail 13.

Referring to FIGS. 1 and 3, the center rail 13 may extend from a rear edge of the door aperture 3 in the longitudinal direction of the vehicle. The center roller unit 23 may be pivotally mounted on a central portion of the vehicle door 5. In particular, the center roller unit 23 may be mounted in a position adjacent to the rear end of the vehicle door 5. The center roller unit 23 may be guided along the center rail 13.

Figure 31:
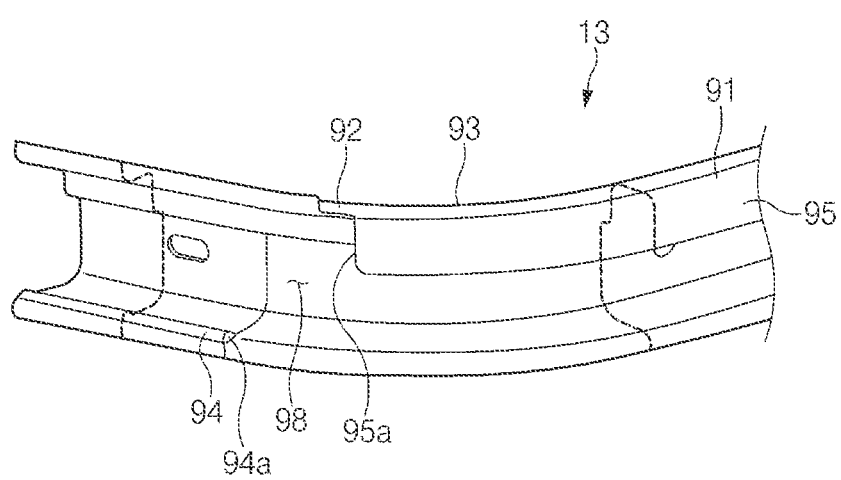
FIG. 31 illustrates a perspective view of a center rail in a vehicle door opening and closing apparatus according to an exemplary embodiment of the present disclosure.

Referring to FIG. 31, the center rail 13 may include a sliding guide 91 extending straightly in the longitudinal direction of the vehicle, and a swing guide 92 extending from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 32:
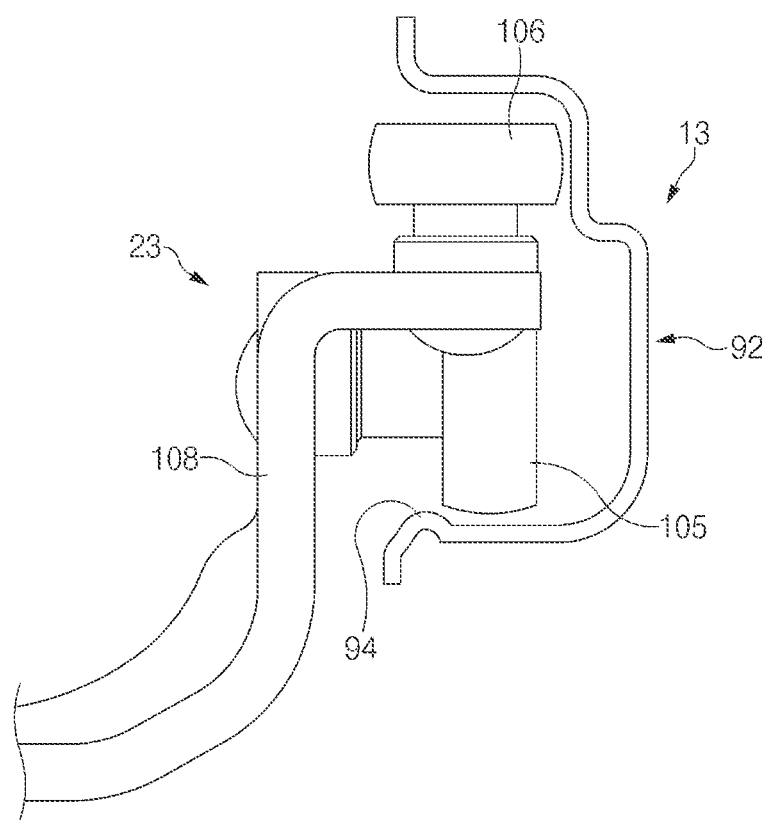
FIG. 32 illustrates a cross-sectional view of a swing guide of the center rail illustrated in FIG. 31.
Figure 33:
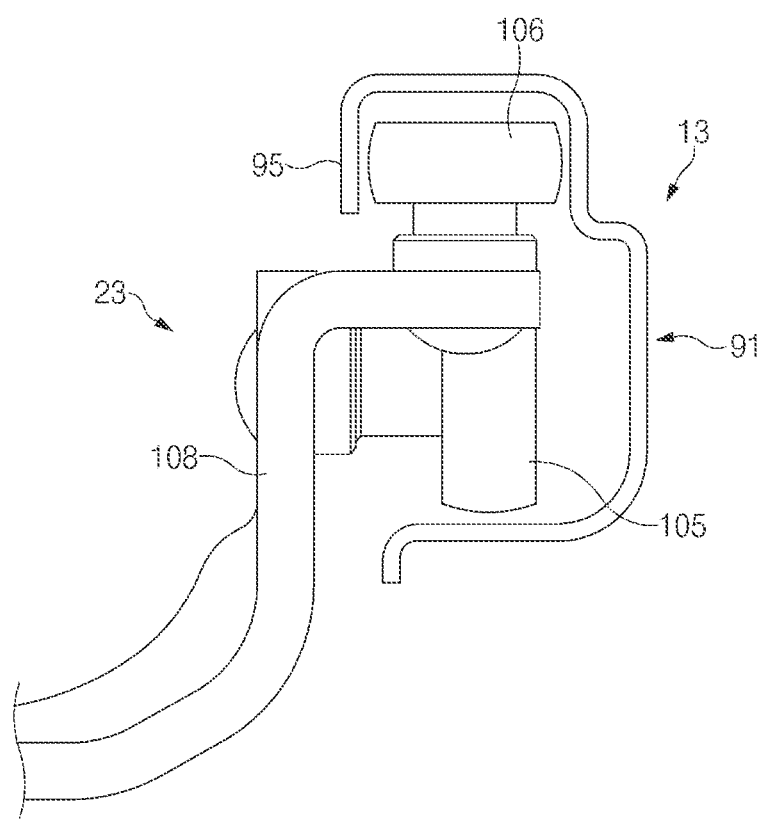
FIG. 33 illustrates a cross-sectional view of a sliding guide of the center rail illustrated in FIG. 31.
Figure 34:
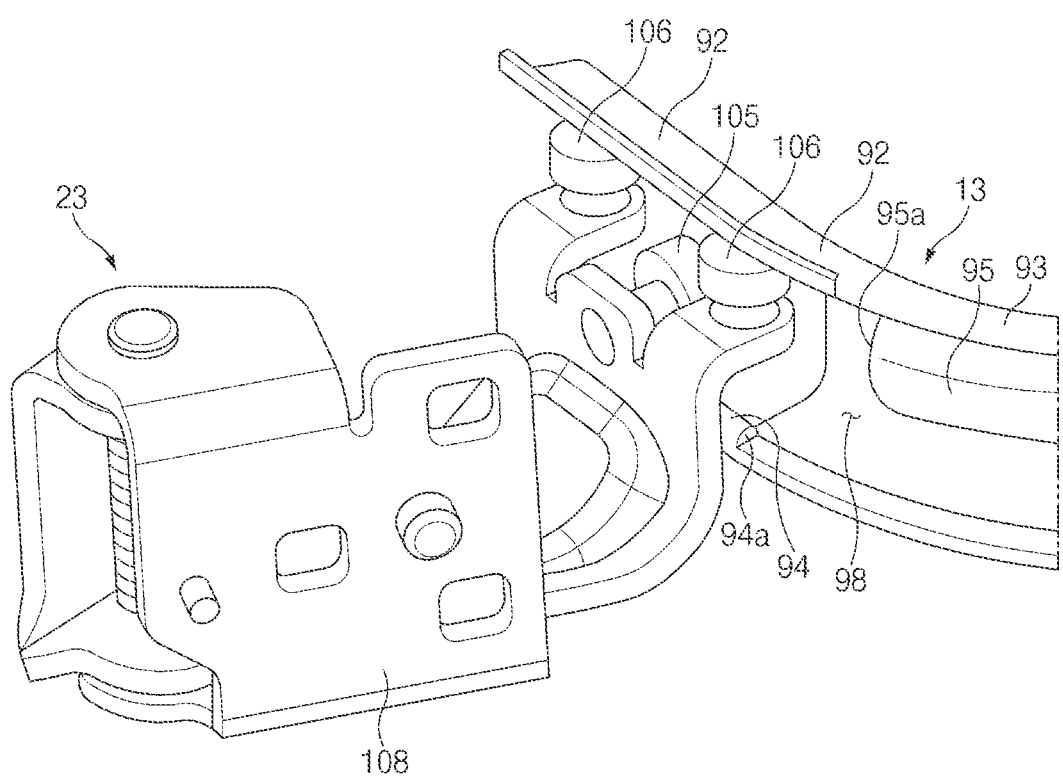
FIG. 34 illustrates a perspective view of a center roller unit which is received in a swing guide of a center rail.

Referring to FIGS. 32 to 34, the center roller unit 23 may include a roller bracket 1o8 and rollers 105 and 106 rotatably mounted on the roller bracket 1o8. The roller bracket 1o8 may be pivotally mounted on the central portion of the vehicle door 5. The rollers 105 and 106 may roll along the center rail 13. As illustrated in FIG. 34, a middle roller 105 and two side rollers 106 disposed on both sides of the middle roller 105 may be rotatably mounted on the roller bracket 108. A rotation axis of the middle roller 105 may be perpendicular to a rotation axis of the side roller 106. The rollers 105 and 106 of the center roller unit 23 may be located on an upper portion of the center rail 13.

When the vehicle door 5 slides in the longitudinal direction of the vehicle as the sliding mode is selected, the sliding guide 91 may guide the rollers 105 and 106 of the center roller unit 23.

Referring to FIGS. 31 and 33, the sliding guide 91 may include a stopper wall 95 preventing the rollers 105 and 106 of the center roller unit 23 from being separated from the sliding guide 91. The sliding guide 91 may have an opening which is open to the exterior of the vehicle, and the stopper wall 95 may be located above the opening of the sliding guide 91. In particular, the stopper wall 95 may be located to face the rollers 105 and 106 of the center roller unit 23 so that the stopper wall 95 may guide the movement of the rollers 105 and 106. The stopper wall 95 may extend along a length of the sliding guide 91 and a length of the bending portion 93. The stopper wall 95 may protrude vertically downward from an upper end of the sliding guide 91. As the stopper wall 95 closes the upper portion of the sliding guide 91 and an upper portion of the bending portion 93, the center roller unit 23 may be prevented from moving away from the sliding guide 91 toward the exterior of the vehicle as illustrated in FIG. 23.

When the vehicle door 5 is opened and closed in the swing mode as the swing mode is selected, the swing guide 92 may guide the rollers 105 and 106 of the center roller unit 23 to be released from the center rail 13.

An exterior side of the swing guide 92 may be entirely open toward the exterior space of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along a swing trajectory T1, the middle roller 105 of the center roller unit 23 may be guided along the guide projection 94 as illustrated in FIG. 32.

Figure 35:
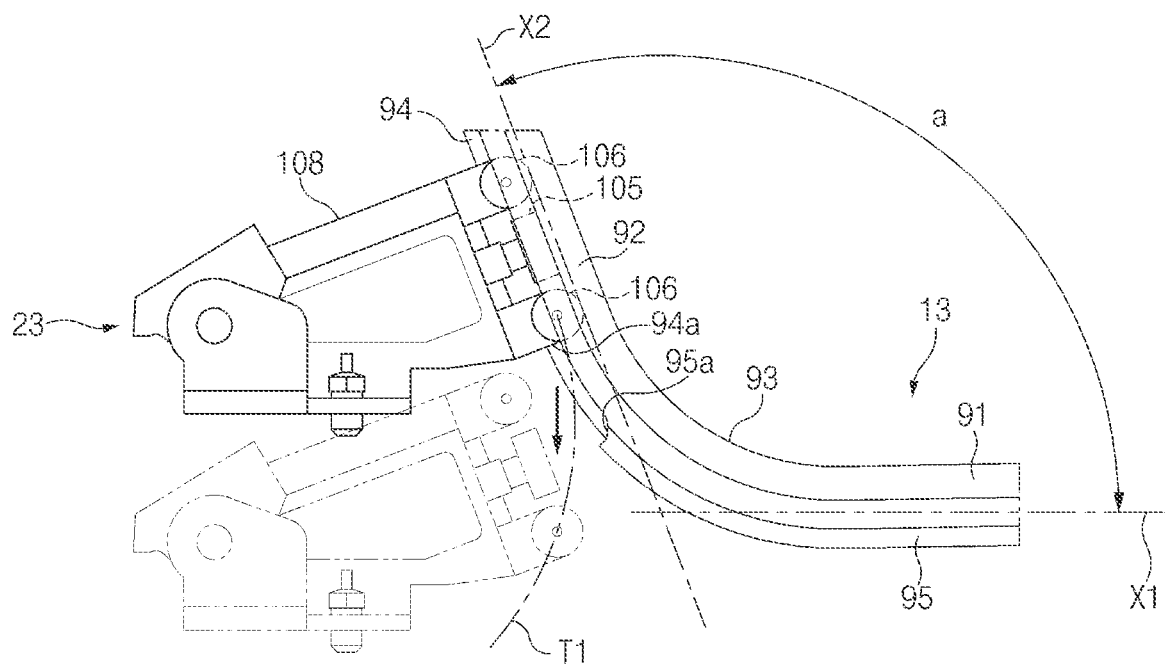
FIG. 35 illustrates an operation in which a center roller unit is released from a swing guide of a center rail.

A front end 95a of the stopper wall 95 of the sliding guide 91 and a rear end 94a of the guide projection 94 may be located so as not to interfere with the swing trajectory T1 of the vehicle door 5. In addition, as illustrated in FIG. 35, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the rollers 105 and 106 of the center roller unit 23 may easily be released from the swing guide 92 of the center rail 13 or may easily be received in the swing guide 92 of the center rail 13.

The center rail 13 may include a space 98 allowing the rollers 105 and 106 of the center roller unit 23 to be released from the center rail 13 or be received in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Due to the space 98, there is no interference when the rollers 105 and 106 of the center roller unit 23 are released from the center rail 13 or are received in the center rail 13 in the swing mode.

FIGS. 1 to 35 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 36:
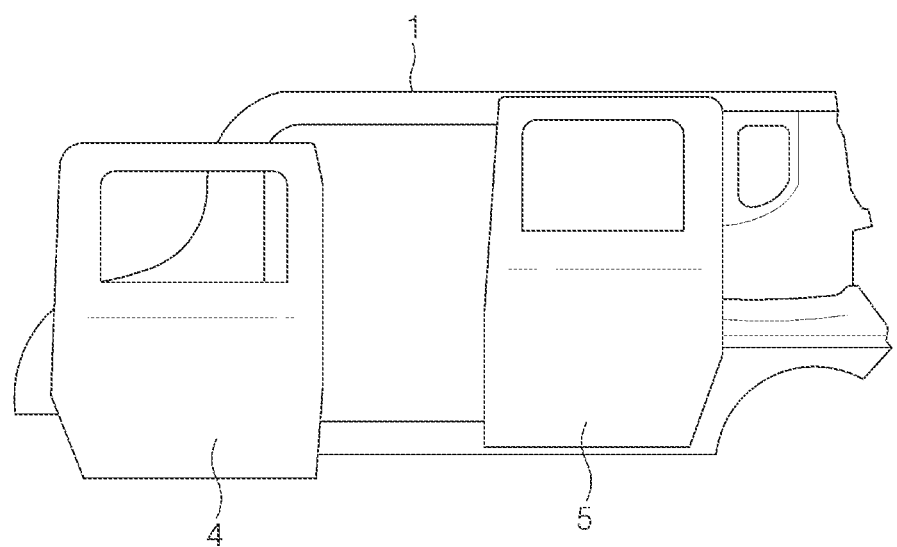
FIG. 36 illustrates a vehicle door opening and closing apparatus according to an exemplary embodiment of the present disclosure, which is applied to a front door of a vehicle, in a state in which the front door is opened in a sliding mode.
Figure 37:
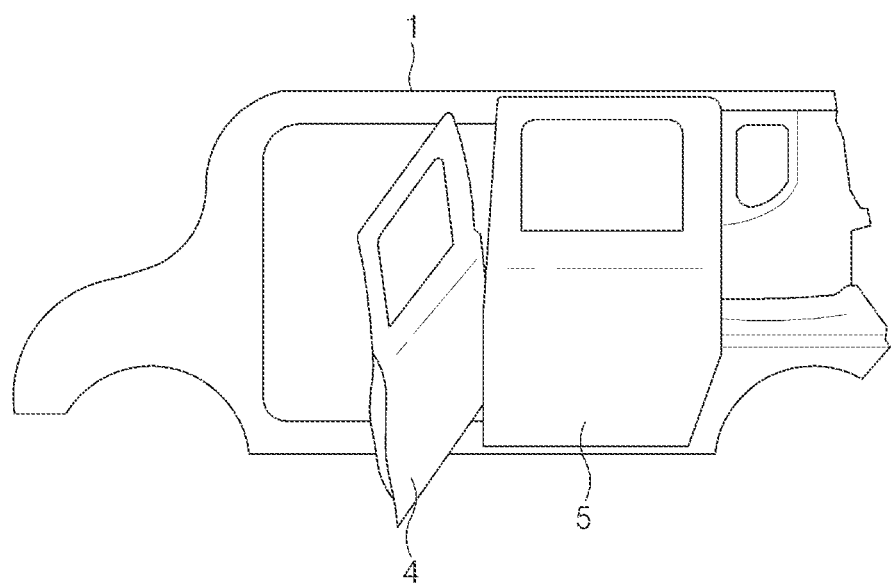
FIG. 37 illustrates a state in which the front door of FIG. 36 is opened in a swing mode.

FIGS. 36 and 37 illustrate the vehicle door opening and closing apparatus according to exemplary embodiments of the present disclosure applied to the front door 4. FIG. 36 illustrates a state in which the front door 4 is opened in the sliding mode, and FIG. 37 illustrates a state in which the front door 4 is opened in the swing mode.

Figure 38:
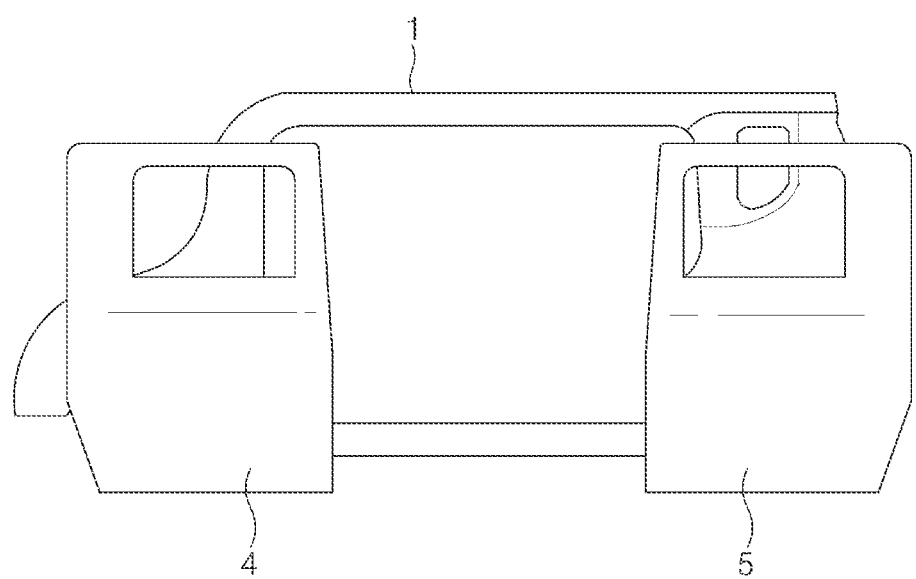
FIG. 38 illustrates a vehicle door opening and closing apparatus according to an exemplary embodiment of the present disclosure, which is applied to a front door and a rear door of a vehicle, in a state in which the front door and the rear door are opened in a sliding mode.
Figure 39:
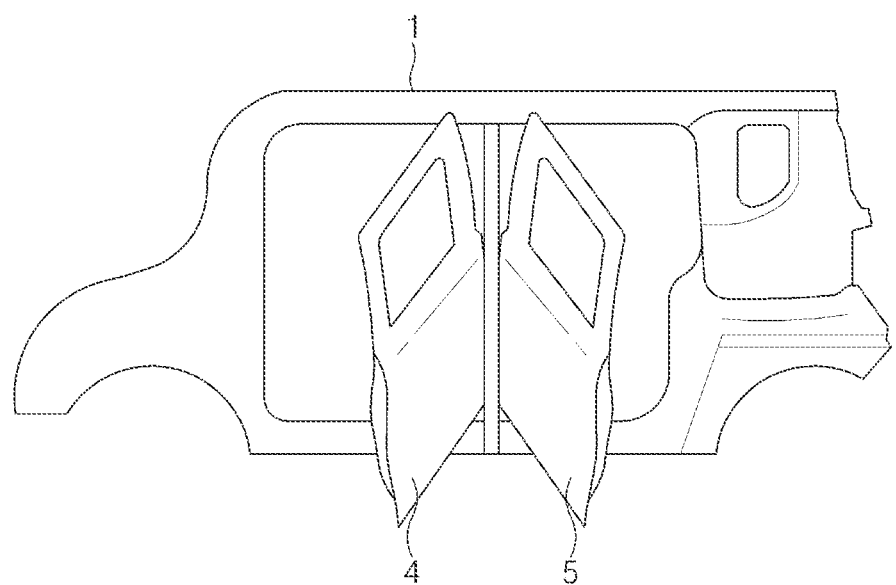
FIG. 39 illustrates a state in which the front door and the rear door of FIG. 38 are opened in a swing mode.

FIGS. 38 and 39 illustrate the vehicle door opening and closing apparatus according to exemplary embodiments of the present disclosure applied to both the front door 4 and the rear door 5. FIG. 38 illustrates a state in which the front door 4 and the rear door 5 are opened in the sliding mode, and FIG. 39 illustrates a state in which the front door 4 and the rear door 5 are opened in the swing mode.

As set forth above, the vehicle door opening and closing apparatus according to exemplary embodiments of the present disclosure may perform the opening and closing operations of the vehicle door by selectively switching the sliding mode and the swing mode, thereby meeting the needs of customers such as convenience and diversity. In addition, it may select the opening and closing operations of the vehicle door by taking the customer's situation and environment into consideration, thereby improving convenience and quality.

In particular, when the vehicle door is opened and closed in the sliding mode, one hold lock may releasably hold the vehicle door in the open position and releasably hold the vehicle door in the closed position, thereby making the hold mechanism of the vehicle door simple, reducing the number of components and the amount of assembly work, improving the operation quality of the vehicle door, and reducing cost and weight.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
 a vehicle door;
 a rail configured to be mounted on a vehicle body;
 a roller unit mounted on the vehicle door, and configured to allow the vehicle door to open and close in a sliding mode in which the vehicle door is configured to slide along the rail and in a swing mode in which the vehicle door is configured to swing in a predetermined position of the rail; and
 a hold lock releasably holding the vehicle door in an open position or releasably holding the vehicle door in a closed position when the vehicle door is opened or closed in the sliding mode, respectively;
 wherein the hold lock comprises a first catch configured to releasably engage with a first striker configured to be mounted on the vehicle body and positioned to correspond to the closed position, and a second catch configured to releasably engage with a second striker configured to be mounted on the vehicle body and positioned to correspond to the open position;
 wherein the first catch and the second catch partially overlap each other;
 wherein the first catch and the second catch form a unitary one-piece structure; and
 wherein the first catch and the second catch are configured to pivot through a first hinge shaft.

2. The apparatus according to claim 1, wherein:
 the first catch includes a first main slot configured to receive the first striker; and
 the second catch includes a second main slot configured to receive the second striker.

3. The apparatus according to claim 1, wherein:
 the first catch is configured to move between a first engaging position and a first release position;
 the first catch is engaged with the first striker in the first engaging position;
 the first striker is released from the first catch in the first release position;
 the second catch is configured to move between a second engaging position and a second release position;
 the second catch is engaged with the second striker in the second engaging position; and
 the second catch is released from the second striker in the second release position.

4. The apparatus according to claim 3, wherein the first catch and the second catch are configured to be biased to the first release position and the second release position by a first biasing element.

5. The apparatus according to claim 1, wherein:
 the first catch and the second catch are connected by a connection portion; and
 the first catch is spaced apart from the second catch.

6. A vehicle door opening and closing apparatus, comprising:
 a vehicle door;
 a rail configured to be mounted on a vehicle body;
 a roller unit mounted on the vehicle door, and configured to allow the vehicle door to open and close in a sliding mode in which the vehicle door is configured to slide along the rail and in a swing mode in which the vehicle door is configured to swing in a predetermined position of the rail; and
 a hold lock releasably holding the vehicle door in an open position or releasably holding the vehicle door in a closed position when the vehicle door is opened or closed in the sliding mode, respectively, wherein the hold lock comprises:
  a first catch configured to releasably engage with a first striker configured to be mounted on the vehicle body and positioned to correspond to the closed position;

a second catch configured to releasably engage with a second striker configured to be mounted on the vehicle body and positioned to correspond to the open position;
a first pawl operatively connected to the first catch; and
a second pawl operatively connected to the second catch.

7. The apparatus according to claim 6, wherein the first pawl and the second pawl are configured to pivot through a second hinge shaft.

8. The apparatus according to claim 6, wherein:
the first catch and the second catch form a unitary one-piece structure;
the first pawl is aligned with the second catch;
the second pawl is aligned with the first catch;
the first catch has a first locking shoulder configured to releasably engage with the second pawl; and
the second catch has a second locking shoulder configured to releasably engage with the first pawl.

9. The apparatus according to claim 8, wherein:
the first pawl is configured to move between a first pawl locking position and a first pawl release position;
the first pawl is locked to the second locking shoulder in the first pawl locking position;
the first pawl is released from the second locking shoulder in the first pawl release position;
the second pawl is configured to move between a second pawl locking position and a second pawl release position;
the second pawl is locked to the first locking shoulder in the second pawl locking position; and
the second pawl is released from the first locking shoulder in the second pawl release position.

10. The apparatus according to claim 9, wherein the first pawl and the second pawl are configured to be biased to the first pawl locking position and the second pawl locking position by a second biasing element.

11. The apparatus according to claim 6, wherein:
the hold lock further comprises a first release lever operatively connected to the first pawl, and a second release lever operatively connected to the second pawl; and
the first pawl, the second pawl, the first release lever, and the second release lever are configured to pivot through a second hinge shaft.

12. The apparatus according to claim 6, wherein:
the hold lock further comprises a first release lever configured to pivot with the first pawl, and a second release lever configured to pivot with the second pawl;
the first release lever and the second release lever are connected to a cable;
when the cable is pulled, the first release lever is configured to allow the first catch to release the first striker; and
when the cable is pulled, the second release lever is configured to allow the second catch to release the second striker.

13. The apparatus according to claim 6, wherein:
the hold lock further comprises a first pull lever operatively connected to the first pawl, and a second pull lever operatively connected to the second pawl;
the first pull lever and the second pull lever are connected to a cable;
when the cable is pulled, the first pull lever is configured to allow the first catch to release the first striker; and
when the cable is pulled, the second pull lever is configured to allow the second catch to release the second striker.

14. A vehicle comprising:
a vehicle body;
a vehicle door coupled to the vehicle body;
a rail mounted on the vehicle body in a longitudinal direction of the vehicle body;
a roller unit mounted on the vehicle door, and configured to allow the vehicle door to open and close in a sliding mode in which the vehicle door is configured to slide along the rail and in a swing mode in which the vehicle door is configured to swing in a predetermined position of the rail; and
a hold lock releasably holding the vehicle door in an open position or releasably holding the vehicle door in a closed position when the vehicle door is opened or closed in the sliding mode, respectively;
wherein the hold lock comprises a first catch configured to releasably engage with a first striker mounted on the vehicle body and positioned to correspond to the closed position, and a second catch configured to releasably engage with a second striker mounted on the vehicle body and positioned to correspond to the open position;
wherein the first catch and the second catch partially overlap each other;
wherein the first catch and the second catch form a unitary one-piece structure; and
wherein the first catch and the second catch are configured to pivot through a first hinge shaft.

15. The vehicle according to claim 14, wherein:
the first catch includes a first main slot configured to receive the first striker; and
the second catch includes a second main slot configured to receive the second striker.

16. The vehicle according to claim 14, wherein:
the first catch is configured to move between a first engaging position and a first release position;
the first catch is engaged with the first striker in the first engaging position;
the first striker is released from the first catch in the first release position;
the second catch is configured to move between a second engaging position and a second release position;
the second catch is engaged with the second striker in the second engaging position; and
the second catch is released from the second striker in the second release position.

17. The vehicle according to claim 16, wherein the first catch and the second catch are configured to be biased to the first release position and the second release position by a first biasing element.

18. The vehicle according to claim 14, wherein:
the first catch and the second catch are connected by a connection portion; and
the first catch is spaced apart from the second catch.

19. The apparatus according to claim 1, wherein:
the first catch is configured to move between a first engaging position and a first release position;
the first catch is engaged with the first striker in the first engaging position; and
the first striker is released from the first catch in the first release position.

20. The apparatus according to claim 1, wherein:
the second catch is configured to move between a second engaging position and a second release position;

the second catch is engaged with the second striker in the second engaging position; and the second catch is released from the second striker in the second release position.

* * * * *